US008559787B2

(12) United States Patent
Okada et al.

(10) Patent No.: US 8,559,787 B2
(45) Date of Patent: Oct. 15, 2013

(54) RECORDING METHOD AND RECORDING MEDIUM PLAYBACK SYSTEM

(75) Inventors: Tomoyuki Okada, Nara (JP); Yoshihiro Mori, Sherman Oaks, CA (US); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 1471 days.

(21) Appl. No.: 11/628,917

(22) PCT Filed: Jul. 5, 2005

(86) PCT No.: PCT/JP2005/012416
§ 371 (c)(1),
(2), (4) Date: Jul. 25, 2008

(87) PCT Pub. No.: WO2006/004122
PCT Pub. Date: Jan. 12, 2006

(65) Prior Publication Data
US 2009/0003805 A1    Jan. 1, 2009

(30) Foreign Application Priority Data
Jul. 6, 2004    (JP) .................................. 2004-199175

(51) Int. Cl.
*H04N 9/80* (2006.01)
(52) U.S. Cl.
USPC ............................ 386/239; 386/241; 386/248
(58) Field of Classification Search
USPC ........................................................ 386/239
See application file for complete search history.

(56) References Cited

U.S. PATENT DOCUMENTS

| 6,178,147 | B1 | 1/2001 | Fujinami |
| 6,574,419 | B1 | 6/2003 | Nonomura et al. |
| 2001/0003518 | A1 | 6/2001 | Fujinami |
| 2003/0108338 | A1 | 6/2003 | Nonomura et al. |
| 2003/0219225 | A1 | 11/2003 | Horii et al. |
| 2004/0105661 | A1 | 6/2004 | Seo et al. |
| 2004/0109677 | A1 | 6/2004 | Seo et al. |

(Continued)

FOREIGN PATENT DOCUMENTS

| JP | 11-126427 | 5/1999 |
| JP | 2000-348467 | 12/2000 |

(Continued)

OTHER PUBLICATIONS

European Broadcasting Union, "Digital Video Broadcasting (DVB); Subtitling Systems"; Final Draft ETSI EN 300 743 V1.2.1 (Jun. 2002) (European Standard, Telecommunications series); pp. 1-48.*

(Continued)

*Primary Examiner* — Kambiz Zand
*Assistant Examiner* — Imhotep Durham
(74) *Attorney, Agent, or Firm* — Panasonic Patent Center

(57) ABSTRACT

A Browsable SlideShow is recorded on a BD-ROM. The Browsable SlideShow includes a video stream, an audio stream and PlayList information. The video stream and the audio stream are recorded on separate areas on an optical disc. The PlayList information includes a plurality of pieces of PlayItem information, each of which has an In_time and an Out_time which specify a single piece of picture data in the video stream and a Still_time indicating a period during which the piece of picture data is still-displayed. A still period indicated by the Still_time is a length of time that is longer than or equal to a VBV-delay when reading a subsequent piece of picture data to an Elementary Buffer 5 of a playback apparatus. The VBV-delay is based on the time required for seeking between the separate areas and reading the audio stream.

3 Claims, 32 Drawing Sheets

(56) References Cited

U.S. PATENT DOCUMENTS

| | | |
|---|---|---|
| 2004/0210628 A1* | 10/2004 | Inkinen et al. ............. 709/201 |
| 2005/0105888 A1 | 5/2005 | Hamada et al. |
| 2005/0196143 A1 | 9/2005 | Kato et al. |
| 2005/0201718 A1 | 9/2005 | Kato |
| 2005/0201732 A1 | 9/2005 | Nonomura et al. |
| 2006/0153531 A1 | 7/2006 | Kanegae et al. |
| 2006/0188223 A1 | 8/2006 | Ikeda et al. |
| 2006/0239662 A1 | 10/2006 | Nonomura et al. |
| 2006/0239663 A1 | 10/2006 | Nonomura et al. |

FOREIGN PATENT DOCUMENTS

| | | |
|---|---|---|
| JP | 2001-054059 | 2/2001 |
| JP | 3334799 | 10/2002 |
| JP | 2003-087745 | 3/2003 |
| JP | 2004-128766 | 4/2004 |
| JP | 2004-336566 | 11/2004 |
| TW | 200401209 | 1/2004 |
| WO | WO 00/60598 | 10/2000 |
| WO | 2004/023479 | 3/2004 |
| WO | 2004/047104 | 6/2004 |
| WO | 2004/049710 | 6/2004 |
| WO | 2004/068854 | 8/2004 |
| WO | 2004/088661 | 10/2004 |

OTHER PUBLICATIONS

The extended European Search Report dated Mar. 23, 2010 for the corresponding EP Application No. 05765467.5.

* cited by examiner

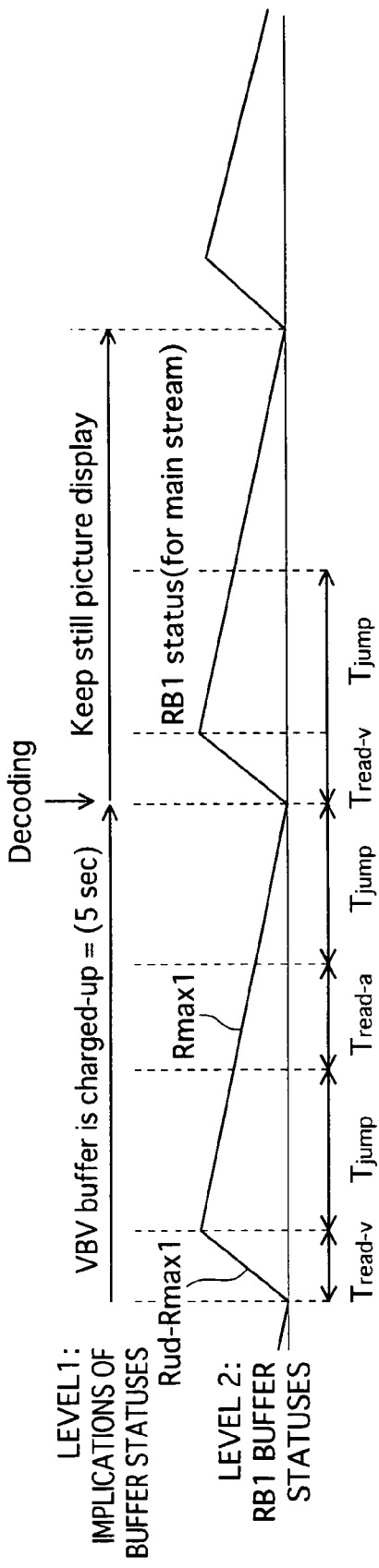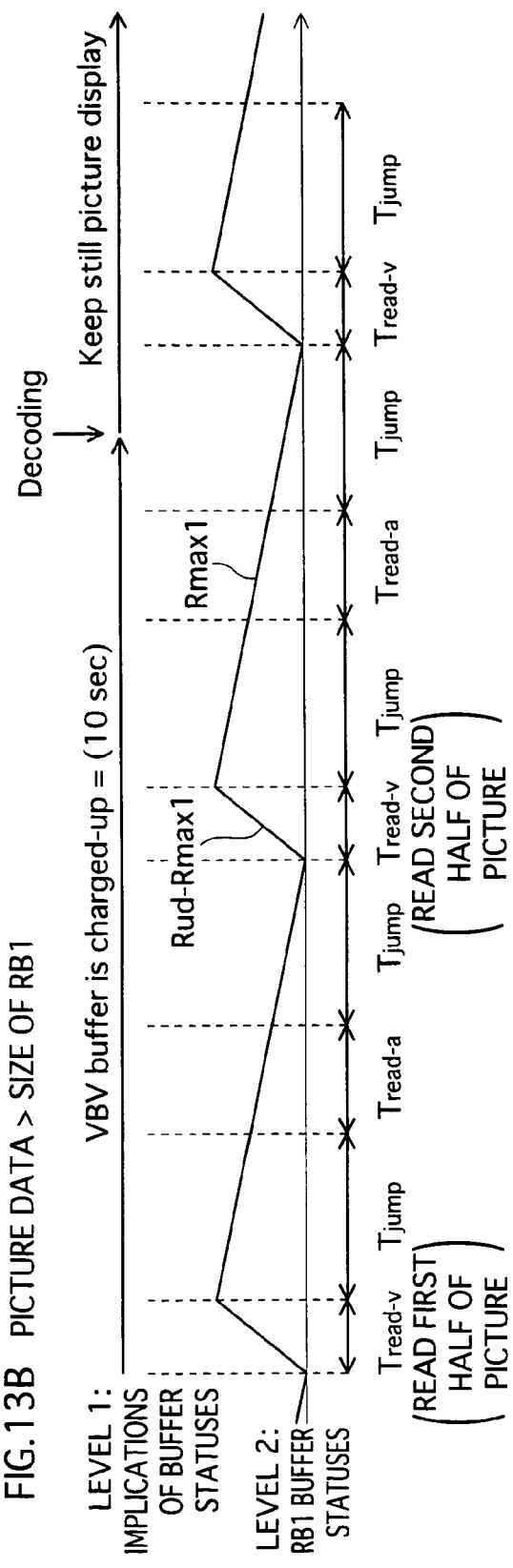
FIG.13A PICTURE DATA < SIZE OF RB1
FIG.13B PICTURE DATA > SIZE OF RB1

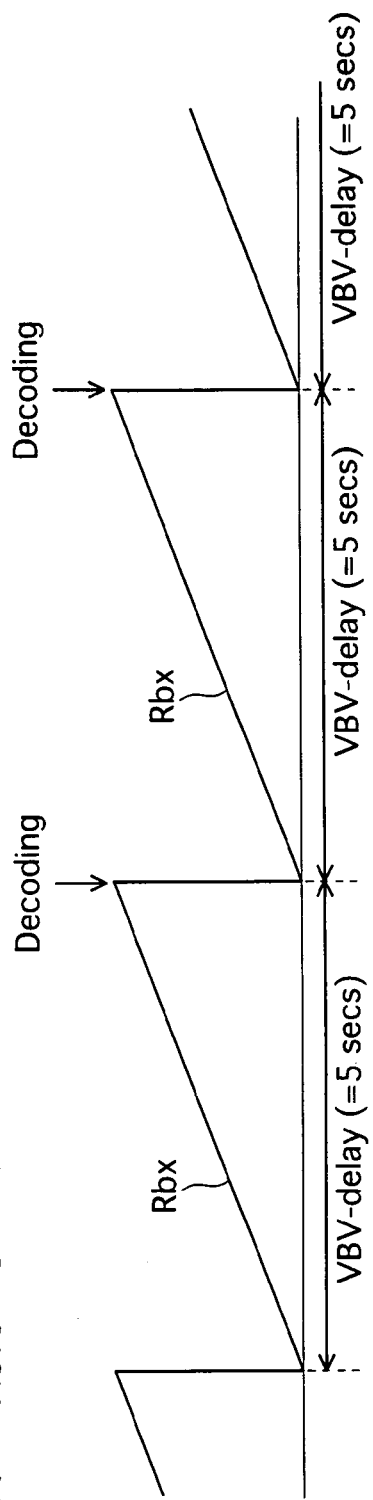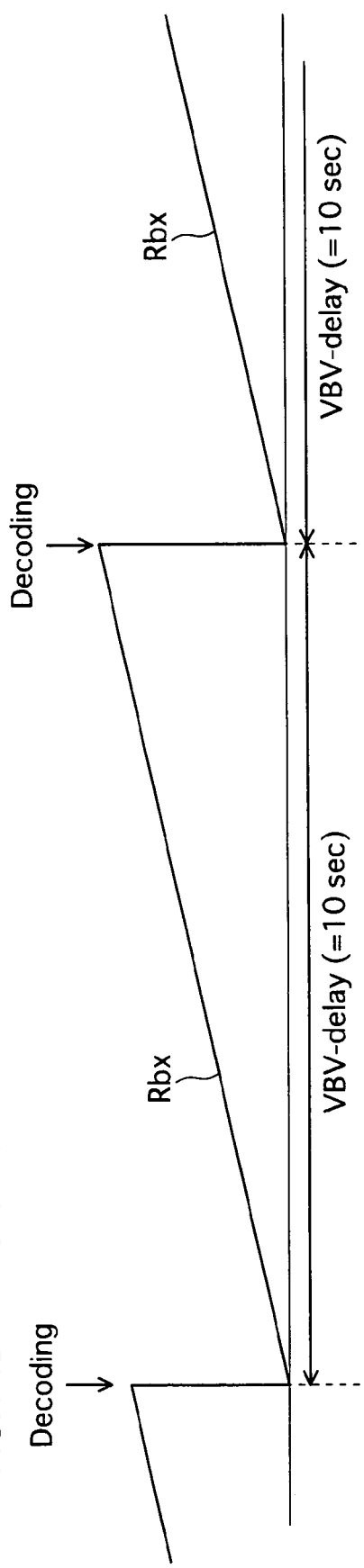

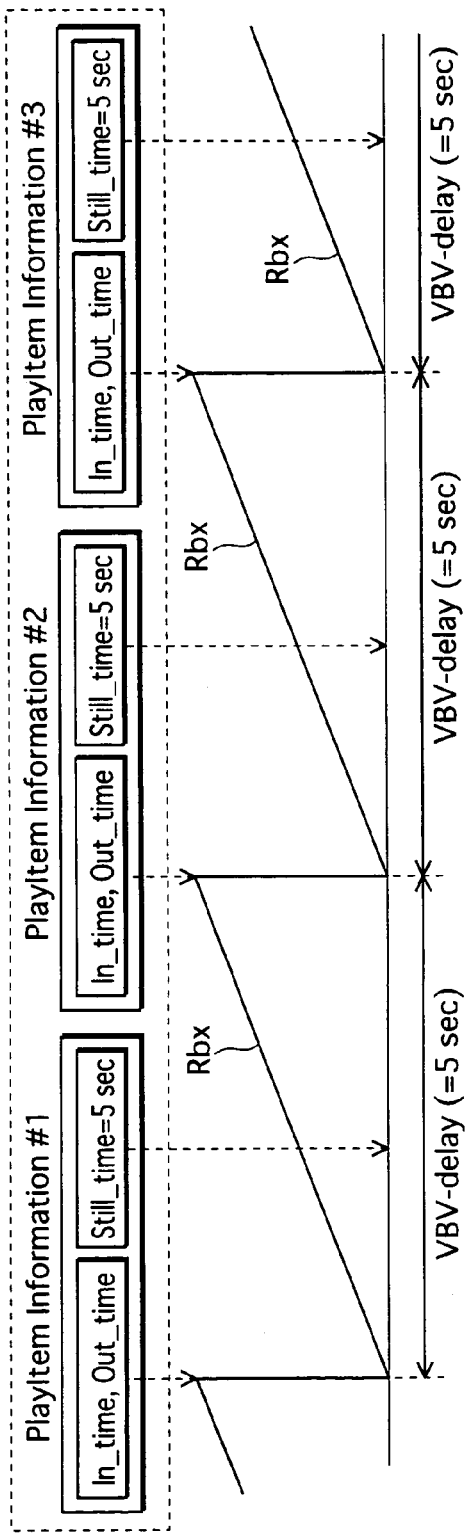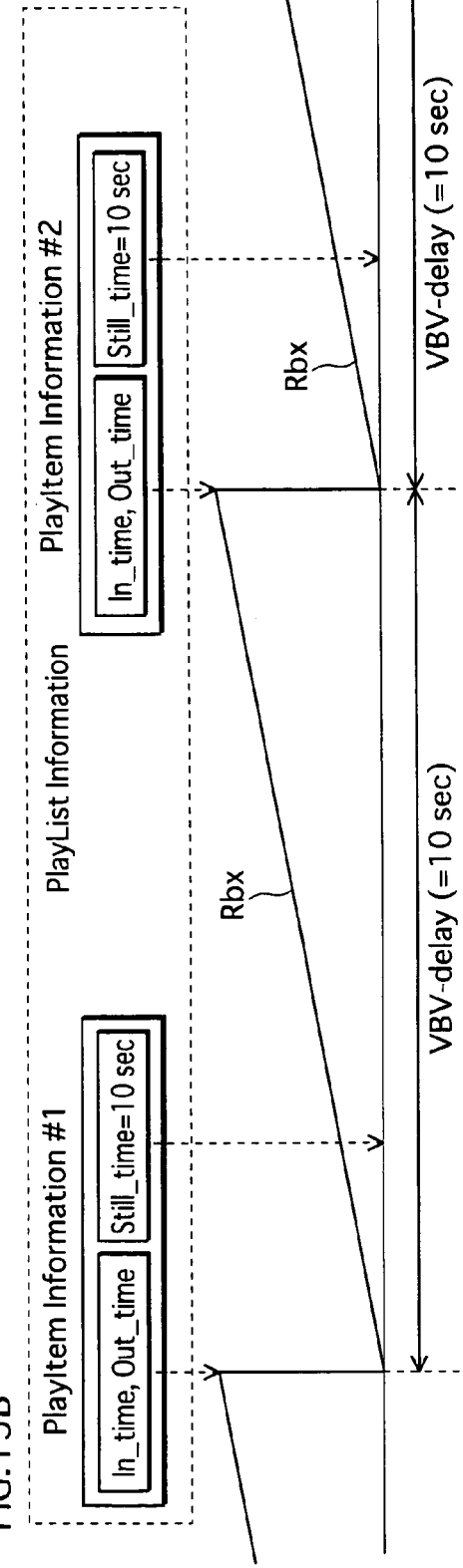

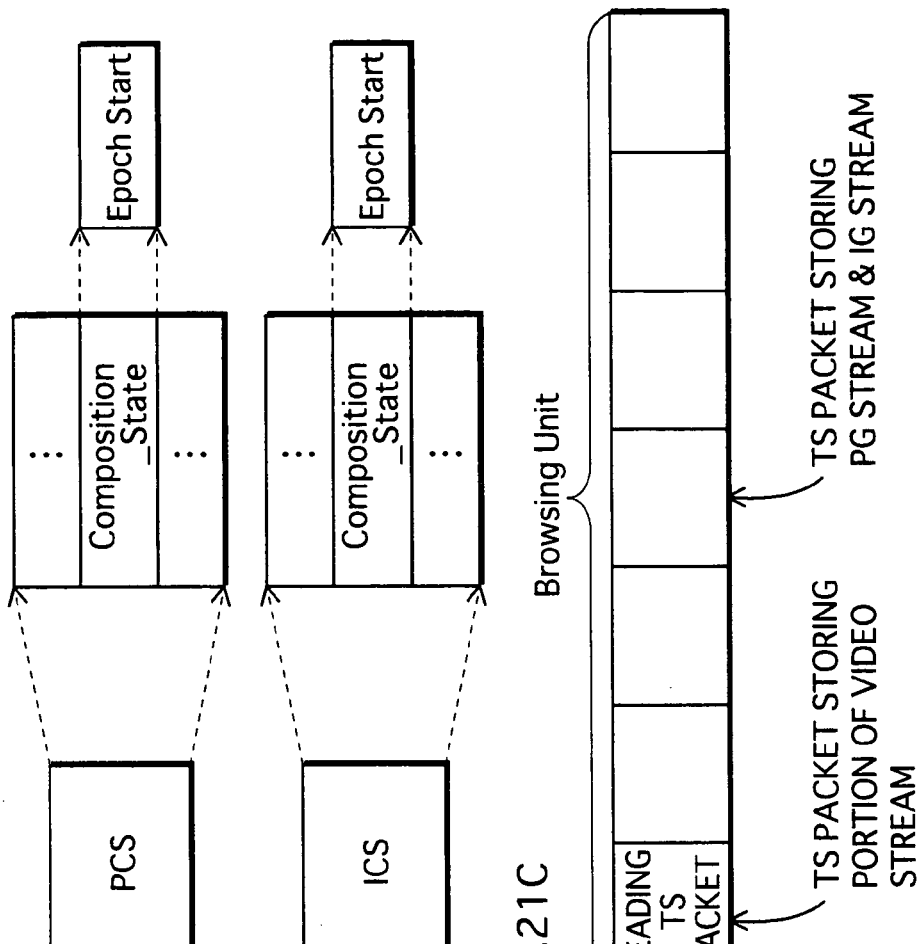
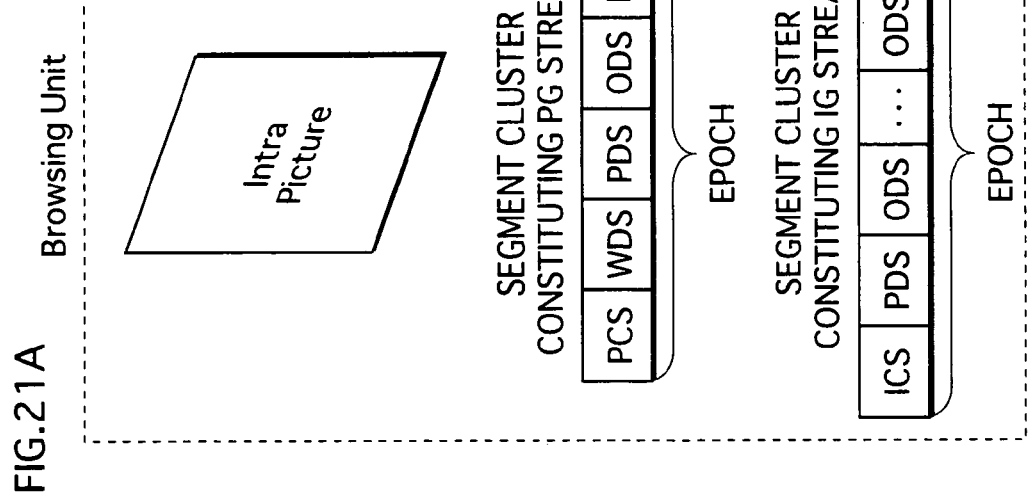
FIG.21A
FIG.21B Composition_state SETTINGS OF PCS & ICS OF EACH BROWSING UNIT
FIG.21C

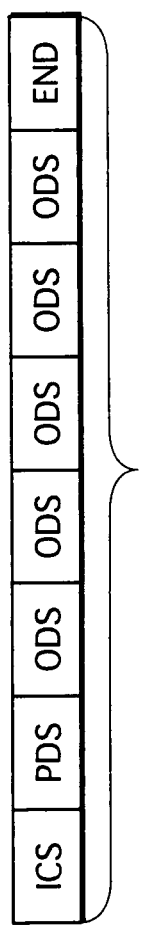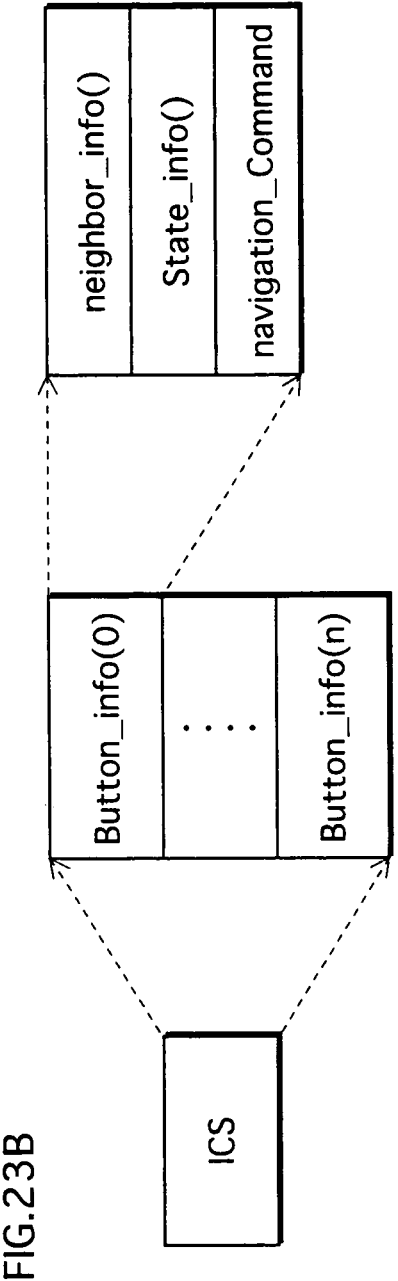
FIG.23A IG STREAM
FIG.23B

DATA STRUCTURE OF ICS IN PTS=tx

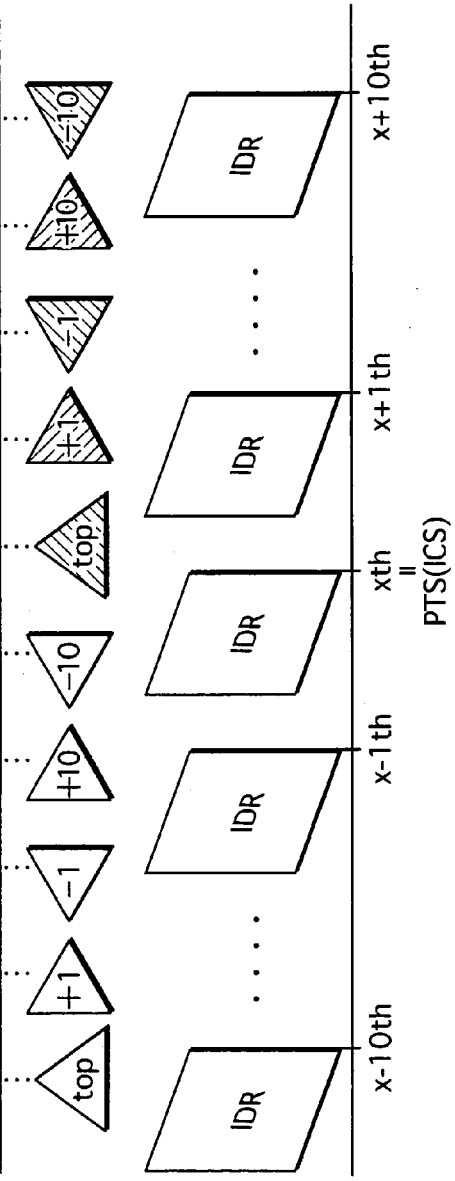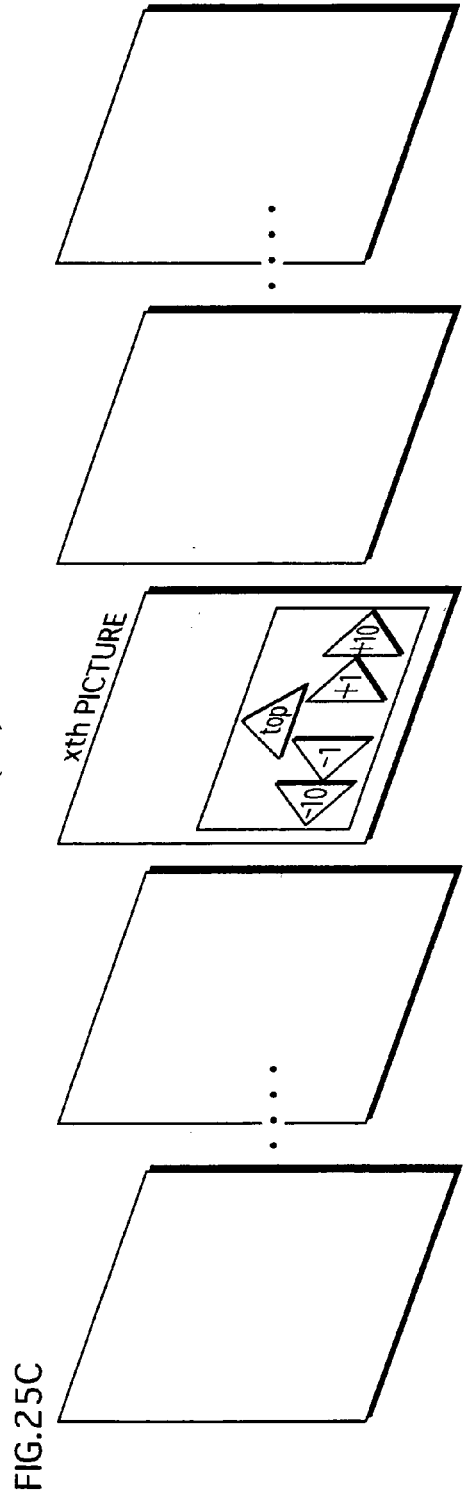
FIG.25A
FIG.25B
FIG.25C

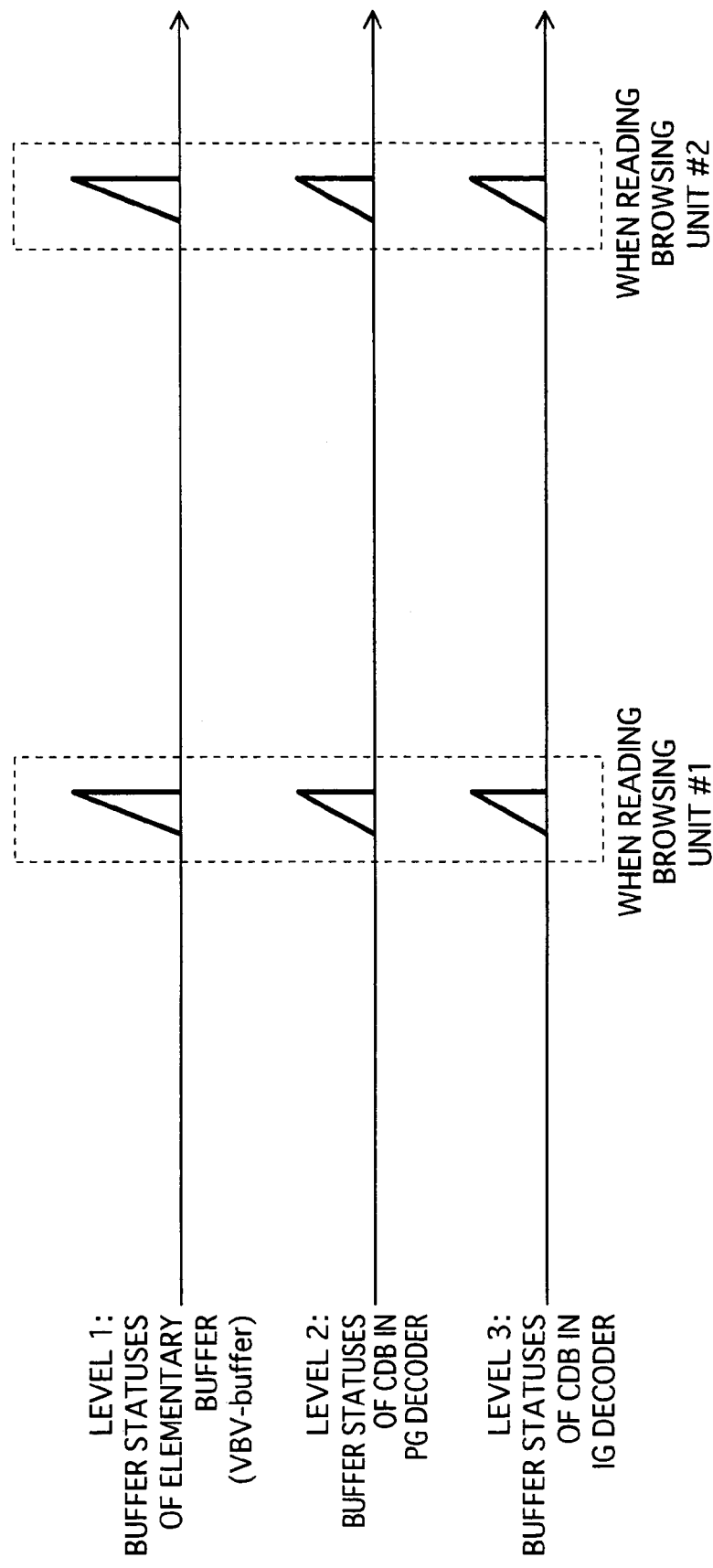

RECORDING METHOD AND RECORDING MEDIUM PLAYBACK SYSTEM

TECHNICAL FIELD

The present invention relates to the technical field of slideshow playback.

BACKGROUND ART

A predominant function of optical disc playback apparatuses is to play back video. A slideshow playback function is one application of this video playback function, whereby a plurality of picture data pieces recorded on an optical disc are decoded one by one for viewing by a user.

With BD-ROMs (BluRay Disc Read Only Memory) which are to appear in the near future, it is possible to record picture data at the high resolution of 1920×1080. If copyrighted photographs are recorded on a BD-ROM as picture data, and a playback apparatus executes slideshow playback for works recorded on this BD-ROM, the user can browse copyrighted photographs and the like with vividness favorably comparable to printed published works.

Providing the slideshow function allows the user to not only play back films, but also enjoy playing back copyrighted photographs, thereby making it possible to increase the appeal of BD-ROM playback apparatuses. Note that conventional technology regarding optical disc playback apparatuses is described in the following document.

Patent document 1: Japanese Patent Application Publication No. 2000-348467

DISCLOSURE OF THE INVENTION

Problems Solved by the Invention

However, realizing slideshow playback with audio playback requires devotion to processing involving reading audio data from the optical disc, and supplying the audio data to a buffer. Here, if there is a seek to write not only audio data, but also picture data to a buffer, a buffer underflow will occur, and there will be an interruption in the playback of audio data. Since there is a chance of an interruption in the playback of audio data, conventional optical disc playback apparatuses preload the picture data into a memory to avoid the occurrence of a disc-seek during audio data playback. If, however, the picture data has a high resolution such as 1920×1080, preloading the plurality of picture data pieces into the memory for a slideshow requires a substantial amount of memory, which is a problem in terms of being a hindrance to commercializing playback apparatuses at low cost.

An object of the present invention is to provide an optical disc that does not allow interruptions in audio data playback, while realizing price-reduction in the commercialization of the playback apparatus.

Means to Solve the Problems

The above object is achieved by an optical disc pertaining to the present invention, being an optical disc having recorded thereon a slideshow application, wherein the slideshow application includes a video stream, an audio stream and playlist information, the video stream has a plurality of browsing units, each of the browsing units includes at least one piece of picture data, the playlist information includes period information indicating a still period for which display of the at least one piece of picture data included in each of the browsing units is to be frozen, and the still period indicated by the period information is equal to or exceeds a time length for reading a subsequent browsing unit to a decoder buffer.

Effects of the Invention

When reading a video stream and an audio stream that are recorded in separate areas on an optical disc, interruptions in audio stream playback can be avoided if the transfer rate of the video stream is lowered as much as possible.

However, if the transfer rate to the video decoder is lowered, the time for reading to the decoder buffer increases. In the present invention, the time for reading to the decoder buffer is therefore indicated by period information in playlist information. Given that the time for reading to the decoder buffer is used as a guide for a still period indicated by the period information, still display is performed for only the period indicated by this period information. If initiation of display of subsequent picture data is delayed, playback of the audio stream, which is performed at the same time, is not interrupted.

As a result, it is possible to realize slideshow playback without interruptions in audio. This slideshow playback does not require the preloading of picture data, thereby enabling low-cost manufacturing of a playback apparatus that realizes slideshow playback which uses high-definition picture data.

This playback apparatus can reproduce a slideshow of copyrighted photographs with vividness favorably comparable to printed published works, thereby increasing the appeal of BD-ROM playback apparatuses, and enabling the promotion and popularization of BD-ROM playback apparatuses.

Also, given that information indicating the still period is indicated in the playlist information, even if a data structure of the playlist information in a slideshow application appears the same as a data structure of playlist information for a video application, the playback apparatus need only execute the same playback control of video application playback, and continue the still display indicated by the period information. Consequently, it is possible to implement the slideshow playback function into the playback apparatus with a format that is compatible with video playback. This enables the promotion of the popularization of a playback apparatus that includes both video playback and slideshow playback functions.

BRIEF DESCRIPTION OF THE DRAWINGS

FIG. 13A shows a transfer of picture data if a size of the picture data is 1.2 MB, and FIG. 13B shows a transfer of picture data if a size of the picture data is 2.2 MB;

FIGS. 14A and 14B show buffer statuses of an Elementary Buffer, in the case of a transfer from the Read Buffer 1 being performed as in FIGS. 13A and 13B;

FIGS. 15A and 15B show Still_time configurations in PlayItem information, in the case of a VBV-delay of FIGS. 14A and 14B occurring in the Elementary Buffer;

FIG. 21A shows an internal structure of a Browsing Unit,

FIG. 21B shows a configuration of a PCS and an ICS, and

FIG. 21C shows from what kind of packet string the Browsing Unit is constituted;

FIG. 23A shows a function segment belonging to the Browsing-Unit, and

FIG. 23B shows an internal structure of an ICS;

FIGS. 25A to 25C show a menu that is displayed when a playback point of a video stream reaches a point tx;

FIG. 32 shows changes in buffer statuses of the Elementary Buffer, a Coded Data buffer 21, and a Coded Data buffer 31 as a result of output from the Read Buffer 1 in FIG. 31.

DESCRIPTION OF THE CHARACTERS

Figure 1:
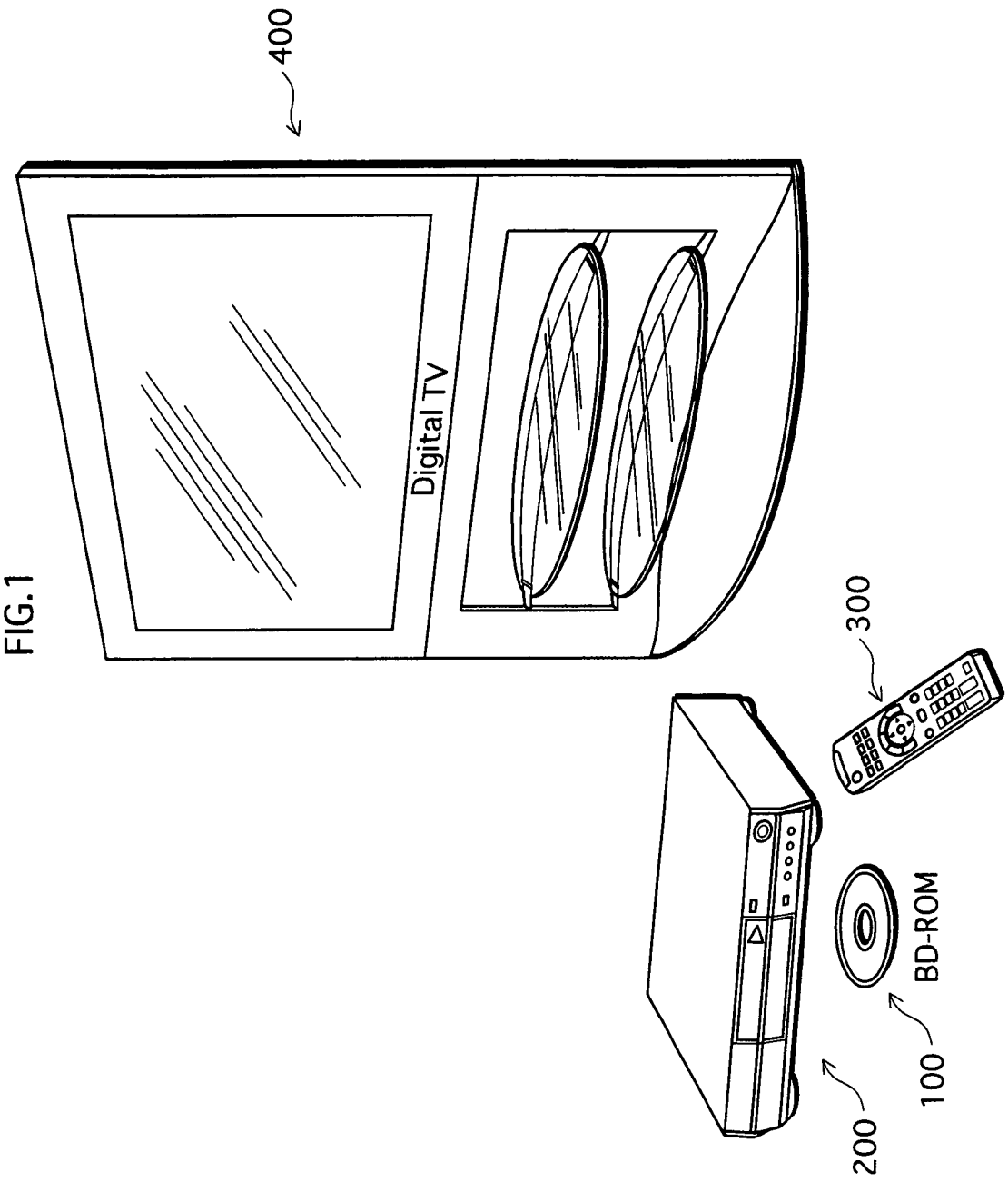
FIG. 1 shows a usage act of an optical disc pertaining to the present invention.

1 Read Buffer
2 Read Buffer
3 drive
4a Demodulation, Ecc decode
4b switch
5 Elementary Buffer
6 Video decoder
7 video plane
8 scenario memory
9 control unit
10 Elementary Buffer
11 audio decoder
12a,b Arrival Time Clock Counter
13a,b Source de-packetizer

BEST MODE FOR CARRYING OUT THE INVENTION

Embodiment 1

The following describes an embodiment of an optical disc pertaining to the present invention. Firstly, of the implementation acts of the optical disc of the present invention, a usage act is described. FIG. 1 shows a usage act of the optical disc pertaining to the present invention. In FIG. 1, the optical disc pertaining to the present invention is a BD-ROM 100. This BD-ROM 100 is used to supply a film to a home theater system formed by a playback apparatus 200, a remote control 300 and a TV 400.

Figure 2:
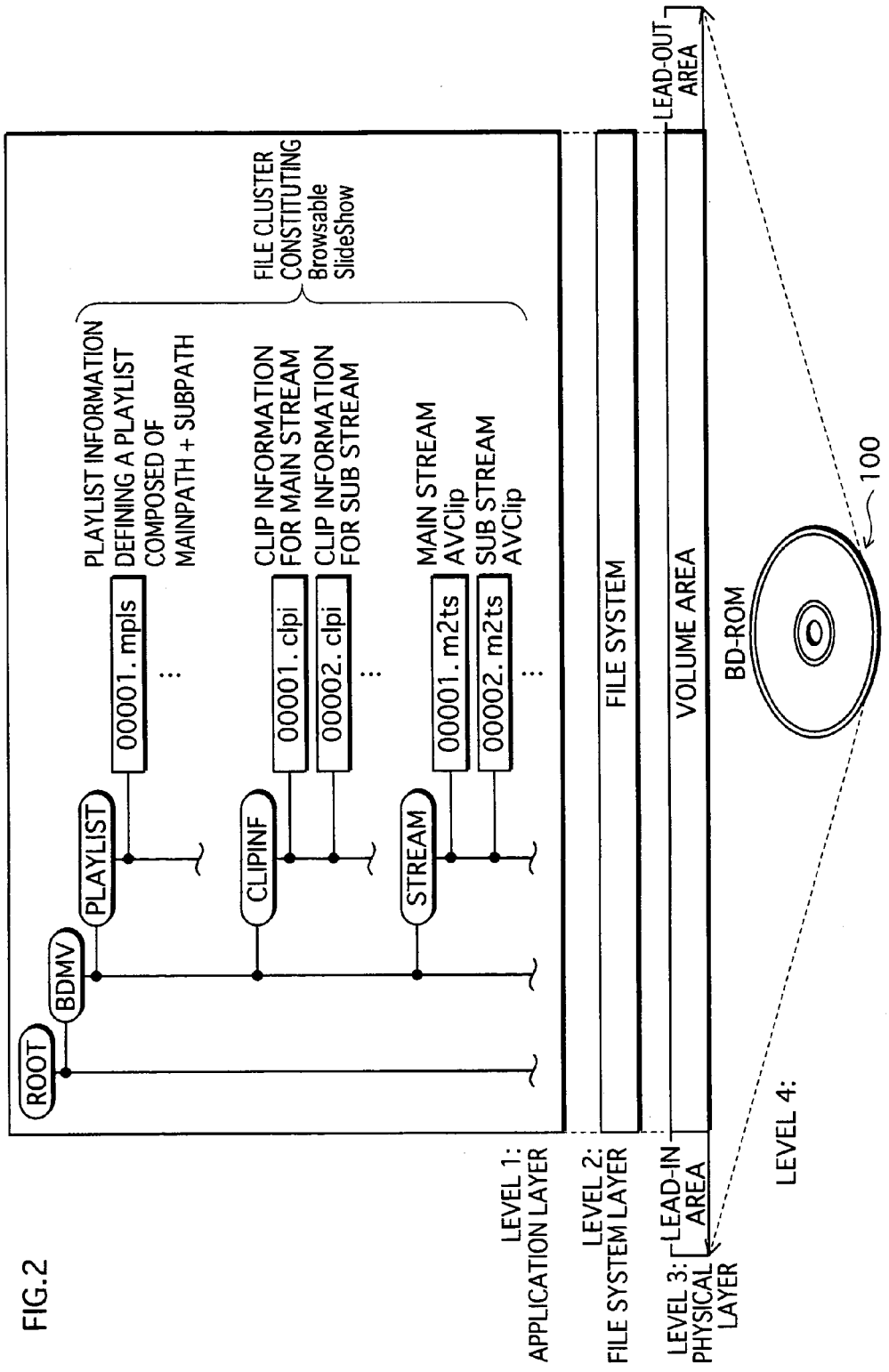
FIG. 2 shows an internal structure of a BD-ROM.

This completes the description of the usage act of the optical disc pertaining to the present invention. Next, of implementation acts of the optical, disc pertaining to the present invention, a production mode is described. The optical disc pertaining to the present invention can be implemented as an improvement to an application layer of a BD-ROM. FIG. 2 shows an internal structure of a BD-ROM.

Level 4 of this figure shows the BD-ROM, and level 3 shows a track on the BD-ROM. The track at level 3 depicts, in a laterally drawn-out form, the tracks spiraling from the inside to the outside of the BD-ROM. This track is composed of a lead-in area, a volume area and a lead-out area. The volume area of this figure has a layer model including a physical layer, a file system layer and an application layer. Level 1 in this figure illustrates an application layer format (application format) of the BD-ROM using a directory structure. Level 1 of the BD-ROM has a ROOT directory, and a BDMV directory therebelow.

Under the BDMV directory are three directories named PLAYLIST directory, CLIPINF directory and STREAM directory.

The STREAM directory is a directory that stores a file cluster, which is the digital stream main body so to speak, and includes files with the extension m2ts (00001.m2ts, 00002.m2ts).

Files with the extension mpls (00001.mpls) are in the PLAYLIST directory.

Files with the extension clpi (00001.clpi, 00002.clpi) are in the CLIPINF directory.

These files are constituent elements of a single Browsable SlideShow. The role of each file is as follows.

00001.m2ts—AVClip which is the main stream in the Browsable SlideShow 00002.m2ts—AVClip which is the sub stream in the Browsable Slideshow 00001.clpi—Clip Information regarding the main stream 00002.clpi—Clip Information regarding the sub stream 00001.mpls—PlayList Information that defines a playlist composed of the main stream and the sub stream The following describes files that are constituent elements of the Browsable SlideShow.

Structure of an AVClip

A file with the extension .m2ts stores an AVClip. There are main stream type and sub stream type AVClips. Here, an AVClip, which is a main stream, is an MPEG2-TS format video stream.

If the encoding method is MPEG2-Video, the video stream is composed of a plurality of Intra pictures. An end-code is assigned to these pictures.

If the encoding method is MPEG2-AVC, the video stream is composed of a plurality of IDR pictures. An end-code is assigned to these pictures as well.

An AVClip, which is a sub stream, is an MPEG-TS format audio stream.

Figure 3:
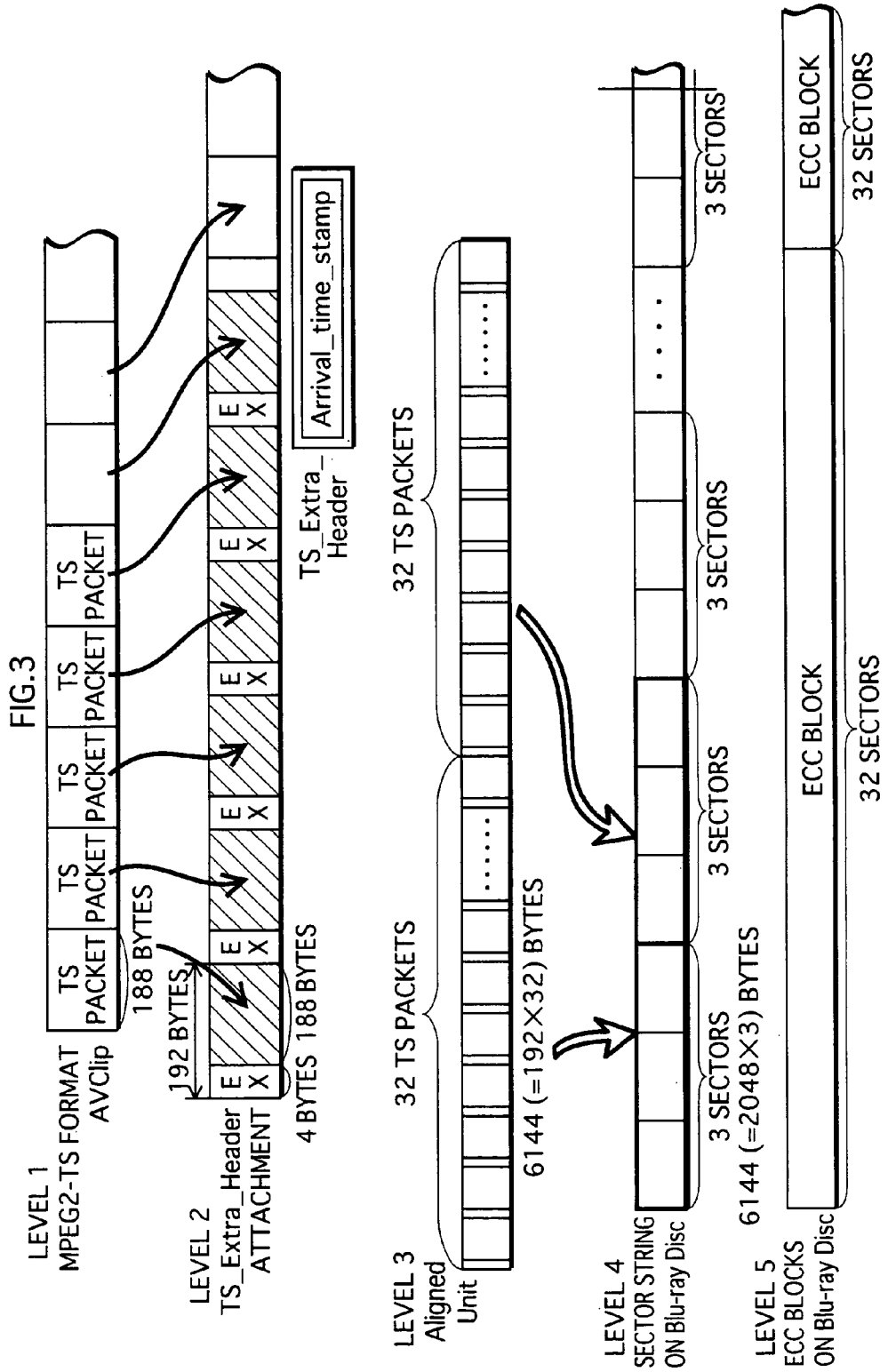
FIG. 3 shows a process that TS packets which constitute an AVClip go through to be written to the BD-ROM.

The following describes how these MPEG2-TS format AVClips are written to the BD-ROM. FIG. 3 shows what process TS packets which constitute an AVClip undergo to be written to the BD-ROM. Level 1 of this figure shows the TS packets constituting the AVClip.

As shown in level 2, TS_Extra_Header (depicted as "EX") is attached to the TS packets constituting the AVClip.

Level 3 and level 4 show a relationship between physical units of the BD-ROM and the TS packets. As shown in level 4, a plurality of sectors are formed on the BD-ROM. TS packets with extra_header attached (hereinafter, simply EX-attached TS packets) are formed into groups of 32, and written to three sectors. Each group composed of 32 EX-attached TS packets is 6144 bytes (=32×192), which matches the 6144-byte size of three sectors (=2048×3). 32 EX-attached TS packets in three sectors are called an "Aligned Unit", and encryption is performed per Aligned Unit when writing to the BD-ROM.

In level 5, error-correction codes are attached per 32 sectors which constitute an ECC block. As long as the playback apparatus accesses the BD-ROM per Aligned Unit, it can obtain 32 complete EX-attached TS packets. This completes the process of writing an AVClip to the BD-ROM.

Clip Information

Figure 4:
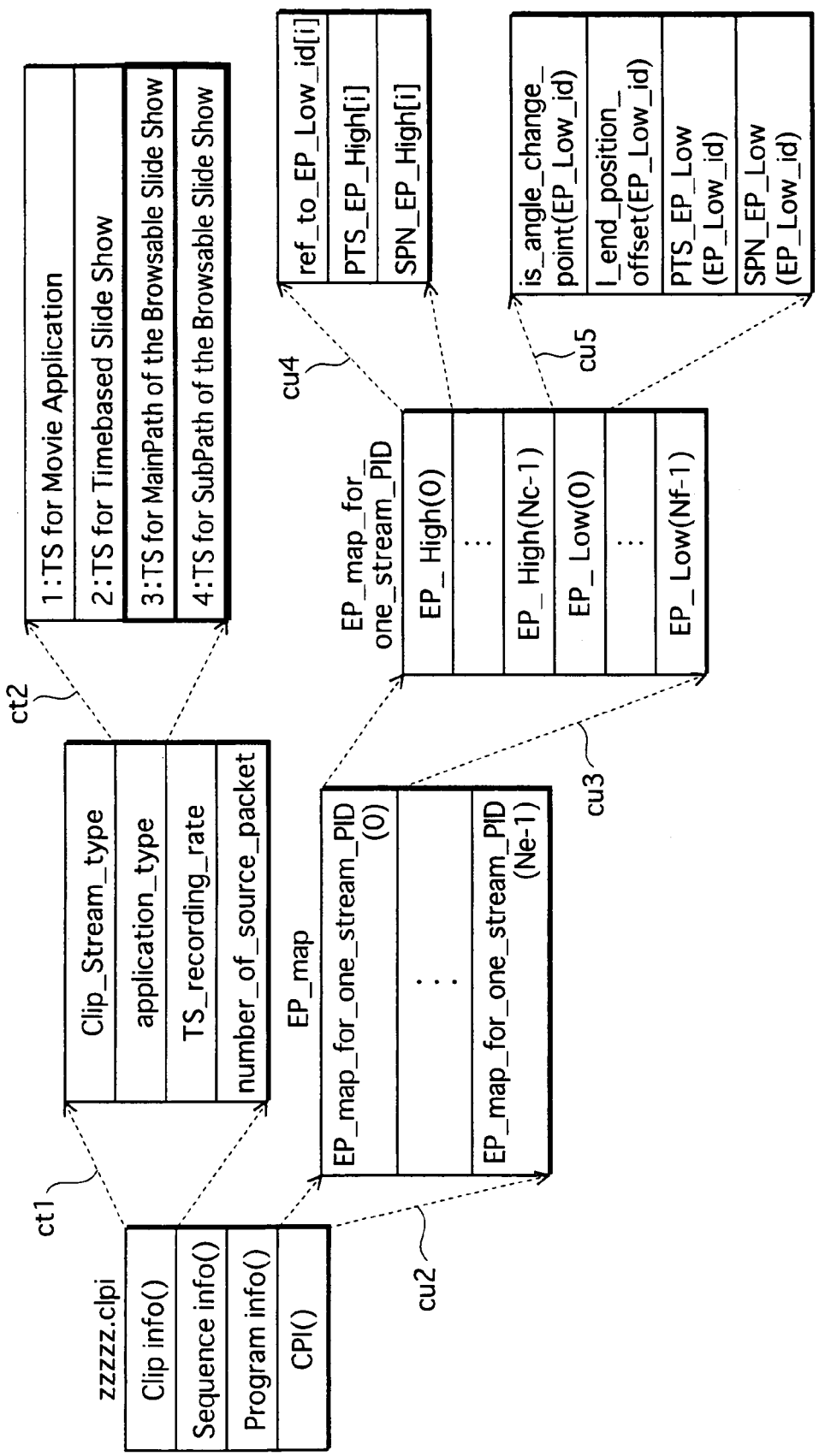
FIG. 4 shows an internal structure of Clip information.

Next is a description of files with the .clpi extension. Files with the clpi extension (00001.clpi, 00002.clpi, 00003.clpi, . . . ) store Clip information. Clip information is management information regarding individual AVClips. FIG. 4 shows an internal structure of Clip information. As shown on the left side of this figure, Clip information includes the following.

i) "ClipInfo( )" storing attribute information of an AVClip file, ii) "Sequence Info( )" storing information regarding an ATC Sequence and an STC Sequence, iii) "Program Info( )" storing information regarding a Program Sequence iv) "Characteristic Point Info (CPI( ))"

CPI(EP_map)

A lead line cu2 in the figure indicates a detailed structure of the CPI. As shown by the lead line cu2, the CPI is composed of an EP_map. The EP_map is composed of a total of Ne EP_map_for_one_stream_PIDs (from EP_map_for_one_stream_PID(0) to EP_map_for_one_stream_PID (Ne−1)). These EP_map_for_one_stream_PIDs are EP_maps regarding individual elementary streams belonging to an AVClip. An EP_map is information that indicates, for a single elementary stream, packet numbers (SPN EP_starts) pertaining to entry positions, which are Access Unit Delimiters of I pictures, in association with entry times (PTS_EP_starts). A lead line cu3 in the figure indicates a detailed structure of an EP_map_for_one_stream_PID.

Accordingly, it is apparent that an EP_map_for_one_stream_PID is composed of a total of Nc EP_Highs (from EP_High(0) to EP_High(Nc−1)), and a total of Nf EP_Lows (from EP_Low(0) to EP_Low(Nf−1)). Here, an EP_High indicates a high-order bit of SPN_EP_start and PTS_EP_start pertaining to an I picture, and an EP_Low indicates a low-order bit of SPN_EP_start and PTS_EP_start pertaining to a I picture.

A lead line cu4 in the figure indicates a detailed structure of an EP_High. As shown by this lead line, EP_High(i) is composed of "ref_to_EP_Low_id[i]" which is a reference value with respect to EP_Low, "PTS_EP_High[i]" which indicates a PTS high-order bit of an I picture, and "SPN_EP_High[i]" which indicates an SPN high-order bit of an I picture. Here, i is an identifier for identifying an arbitrary EP_High.

A lead line cu5 in the figure indicates a detailed structure of an EP_Low. As shown by the lead line cu5, EP_Low is composed of "is_angle change_point(EP_Low_id)" which indicates whether an angle switching operation for a corresponding I picture is possible, "I_end_position_offset(EP_Low_id)" which indicates a size of the corresponding I picture, "PTS_EP_Low(EP_Low_id) which indicates a PTS low-order bit of the corresponding I picture, and "SPN_EP_Low (EP_Low_id)" which indicates an SPN low-order bit of the corresponding I picture. Here, EP_Low_id is an identifier for identifying an arbitrary EP_Low.

Next is a description of Clip info in the Clip information. A lead line ct1 in the figure indicates a detailed structure of Clip info( ). As shown by this lead line, it is apparent that Clip info ( ) includes "clip stream type" which indicates the type of the digital stream, "application_type" which indicates the type of application that uses the AVClip, "TS_recording_rate" which indicates a recording rate of the AVClip, and "number_of_source_packet" which indicates a number of TS packets that constitute the AVClip. "application_type" indicates whether the AVClip corresponding to this Clip information is a TS for Movie Application, a TS for Timebased SlideShow, a TS for MainPath of the Browsable SlideShow, or a TS for SubPath of the Browsable SlideShow. Specifically, if a) application_type=1, the AVClip is a Movie Application;

b) application_type=2, the AVClip is a Timebased SlideShow;

c) application_type=3, the AVClip is a MainPath of the Browsable SlideShow, where "MainPath" signifies that of the video stream-audio stream set that constitutes the Browsable SlideShow, the AVClip is the video stream; and d) application_type=4, the AVClip is a SubPath of the Browsable SlideShow, where "SubPath" signifies that of the video stream-audio stream set that constitutes the Browsable SlideShow, the AVClip is the audio stream.

Figure 5:
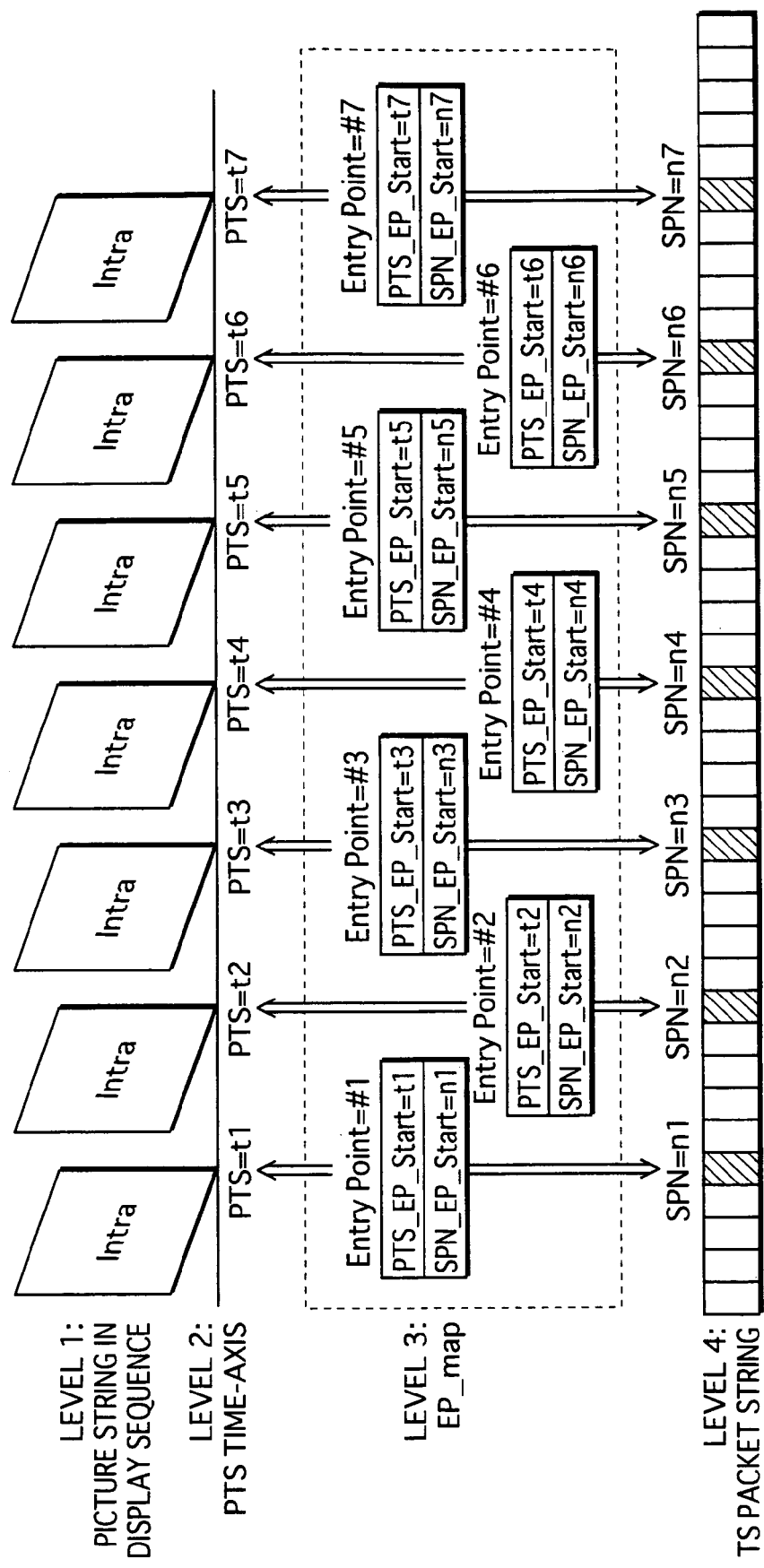
FIG. 5 shows an internal structure of an EP_map configured for a main stream in a Browsable SlideShow.

Next is a description of EP_map configurations for a mainstream of the Browsable SlideShow. The mainstream includes intra pictures configured with a PTS, for playback, at a plurality of points (from t1 to t7) on a time-axis. In this case, the EP_map configuration for this main stream is as shown in FIG. 5. FIG. 5 shows an internal structure of an EP_map configured for a main stream in the Browsable SlideShow.

It is apparent that, since the EP_map is configured so that all pictures are specified in the slideshow, Entry_Points #1 to #7 in the EP_map specify playback points t1, t2, t3, t4, t5, t6 and t7 of individual pictures in the slideshow as entry times (PTS_EP_start), and are associated with entry positions (SPN_EP_start).

Here, playback in the Browsable SlideShow is performed in playback units called "Browsing Units". A "Browsing Unit" is a playback unit which has at least one piece of picture data that is to be still-displayed. A playback apparatus can take a complete piece of picture data from a video stream by accessing a Browsing Unit. It is possible to realize playback of arbitrary picture data as a result of the EP_map indicating an address of this "Browsing Unit" in an Entry Point. Note that a "Browsing Unit" may have two or more pieces of picture data.

This ends the description of Clip information.

PlayList Information

Figure 6:
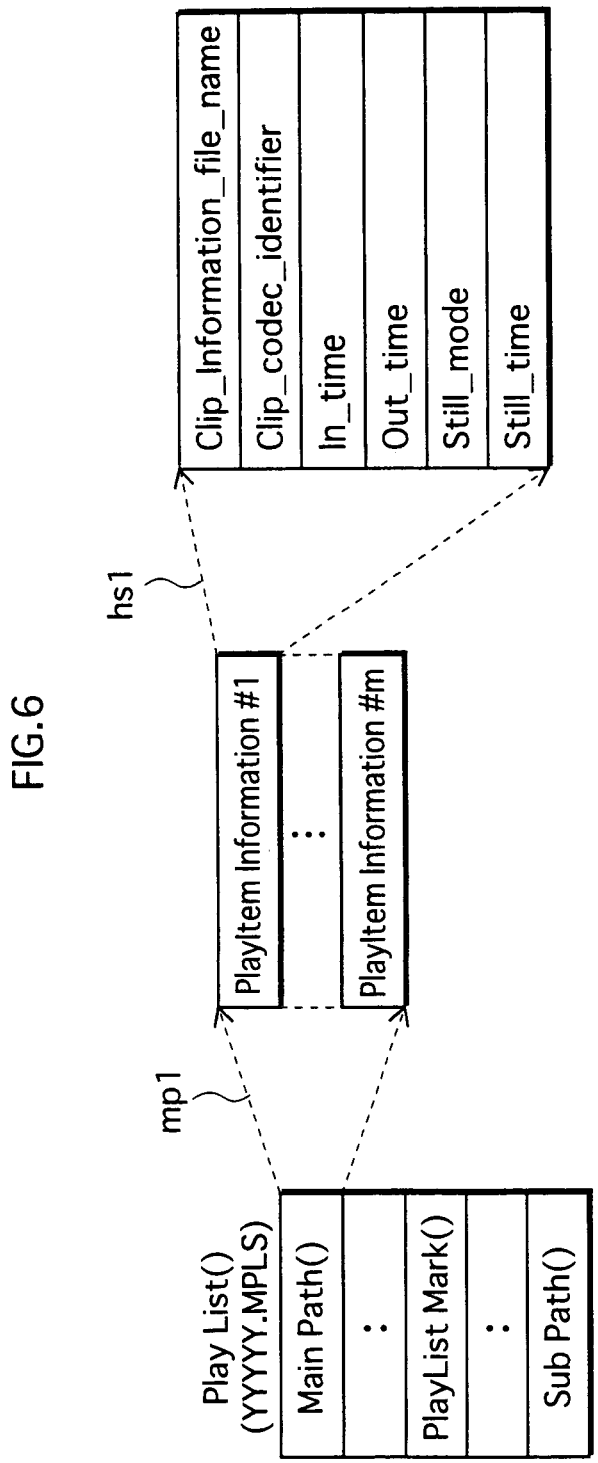
FIG. 6 shows a structure of PlayList information.

Next is a description of PlayList information. Files with the "mpls" extension (00001.mpls, 00002.mpls, 00003.

mpls, . . . ) are files storing PlayList information. PlayList information defines a playback path called a PlayList with reference to an AVClip. FIG. 6 shows a structure of the PlayList information, which as shown in the left side of the figure includes "MainPath information", "PlayListMark information" and "SubPath information".

As shown by a dashed arrow mp1, MainPath information (MainPath( )) is composed of a plurality of pieces of PlayItem information (from PlayItem information #1 to #m). A PlayItem is a playback period that is defined by specifying an In_time and an Out_time on at least one AVClip time-axis. Arranging a plurality of pieces of PlayItem information defines a PlayList (PL) that is composed of a plurality of playback periods. A dashed line hs1 in the figure indicates a detailed structure of the PlayItem information. As shown in the figure, the PlayItem information is composed of "Clip_information_file_name" which indicates a corresponding piece of Clip information, "Clip_codec_identifier" which indicates an encoding method of a corresponding AVClip, "In_time" which indicates a time at which playback of the AVClip is to be started, "Out_time" which indicates a time at which playback of the AVClip is to be ended, "Still_mode", and "Still_time".

It is Still_mode and Still_time that are characteristic among the information elements that constitute this PlayList information.

"Still_mode" indicates whether to still-display a last piece of picture data when playing back picture data from the In_time to the Out_time. If configured to "00", the Still_mode indicates that still-display is not to be continued. If configured to "01", the Still_mode indicates that still-display is to be continued for a limited time period. If the Still_mode is configured to "01", the length of still-display is configured to Still_time. If configured to "02", the Still_mode indicates continuation of still-display for an unlimited time period. An explicit operation from a user cancels the display in the case of still-display for an unlimited time period.

If the Still_mode is configured to 01, the length of time still-display is to be continued is indicated by "Still_time" in units of seconds.

This completes the description of PlayItem information pertaining to the present embodiment. Next is a description of PlayListMark information.

Figure 7:
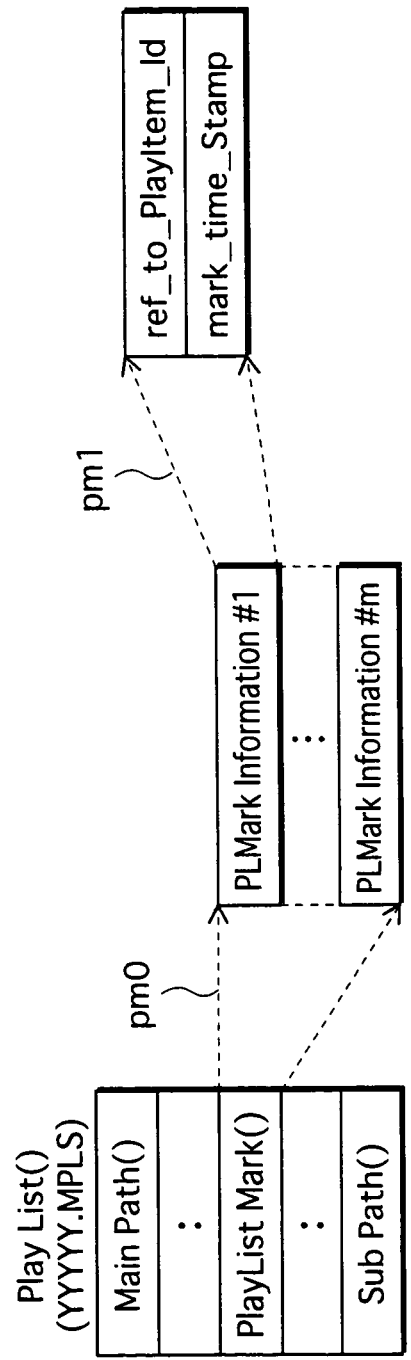
FIG. 7 show an internal structure of PlayListMark information in the PlayList information.

FIG. 7 shows an internal structure of PlayListMark information, which is included in PlayList information. As shown by a lead line pm0 in the figure, PlayListMark information is composed of a plurality of pieces of PLMark information (from #1 to #n). PLMark information (PLMark( )) is information that specifies an arbitrary period on a PL time-axis as chapter points. As shown by a lead line pm1 in FIG. 7, the PLMark information includes "ref_to_PlayItem_Id" which indicates a PlayItem to be a target of chapter specification, and "mark_time_stamp" which indicates a chapter position in the PlayItem using a time code.

Figure 8:
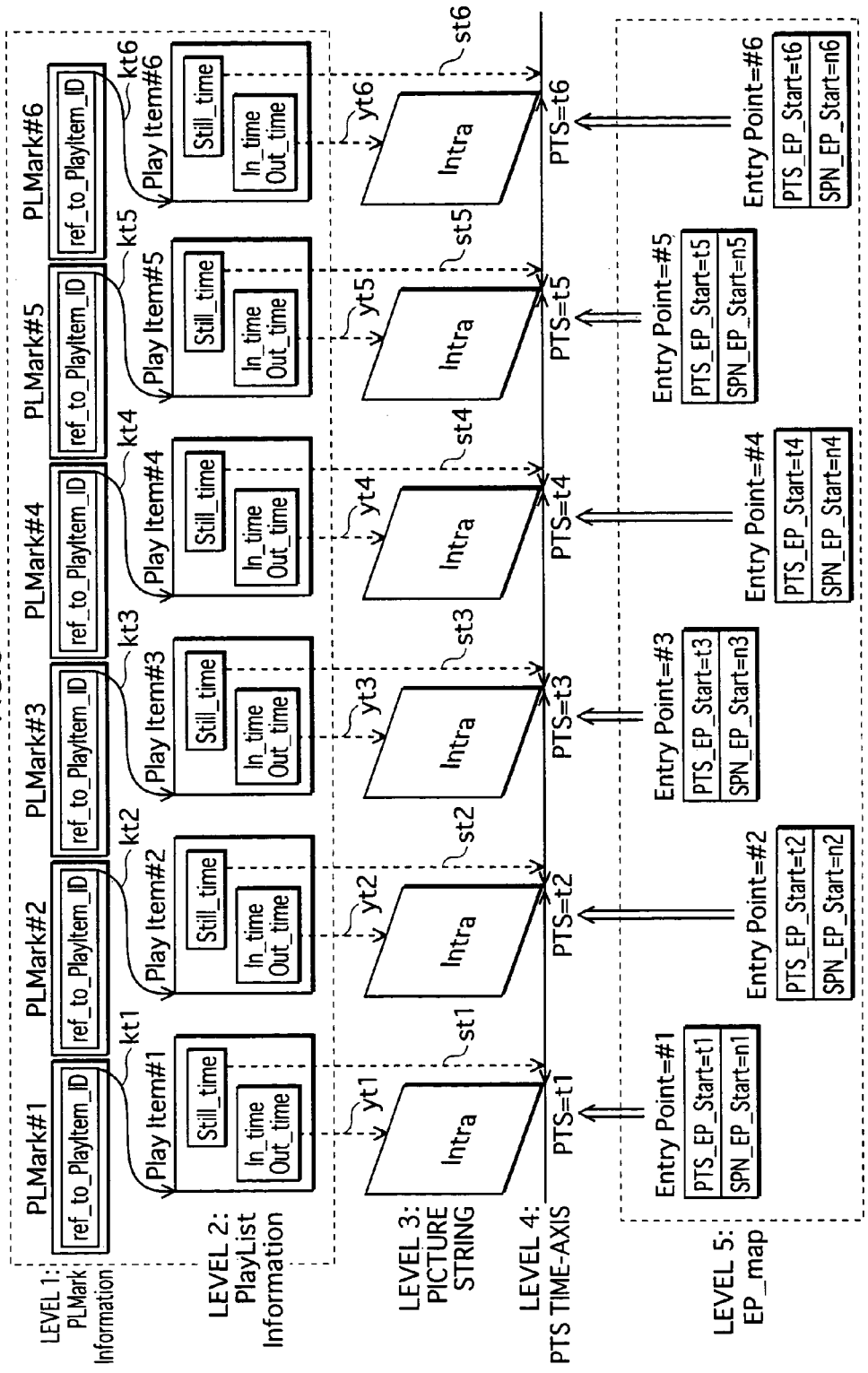
FIG. 8 shows a designation of a slideshow by the PlayList information.

FIG. 8 shows specification of a slideshow by PlayList information. Level 2 in the figure indicates PlayItem information. This level 2 is composed of six pieces of PlayItem information #1 to #6. Arrows yt1, yt2, yt3, yt4, yt5 and yt6 symbolically indicate specification by In_times and Out_times in the PlayItem information, and arrows st1, st2, st3, st4, st5 and st6 symbolically indicate specification by Still_times. As is apparent from these arrows, PlayItem information is configured so as to specify individual pieces of picture data in the video stream. Also, the Still_times are configured so as to indicate a period until display of a subsequent piece of picture data. In this way, the individual pieces of picture data that constitute the slideshow are specified by a respective one of the six pieces of PlayItem information as playback start points and playback end points.

Level 1 in the figure indicates PLMark information. In this level 1 are six pieces of PLMark information #1 to #6. Arrows kt1, kt2, kt3, kt4, kt5 and kt6 indicate specification by ref_to_PlayItem_Id of the PLMark information. As is apparent from these arrows, each ref_to_PlayItem_Id of the PLMark information respectively specifies a piece of PlayItem information.

In this way, an In_time and Out_time in the PlayItem information specify a frame period of a single picture on an AVClip time-axis as a start point and end point of a playback period. A Still_time indicates how long a picture that is being displayed should continue to be displayed. Also, PLMark information of the PlayItem information specifies a single picture as a chapter. In this way, a data structure of a slideshow is established using PlayList information premised on the playback of video. This ends the description of PlayItem information and PLMark information. Next is a description of SubPath information.

SubPath Information

Figure 9:
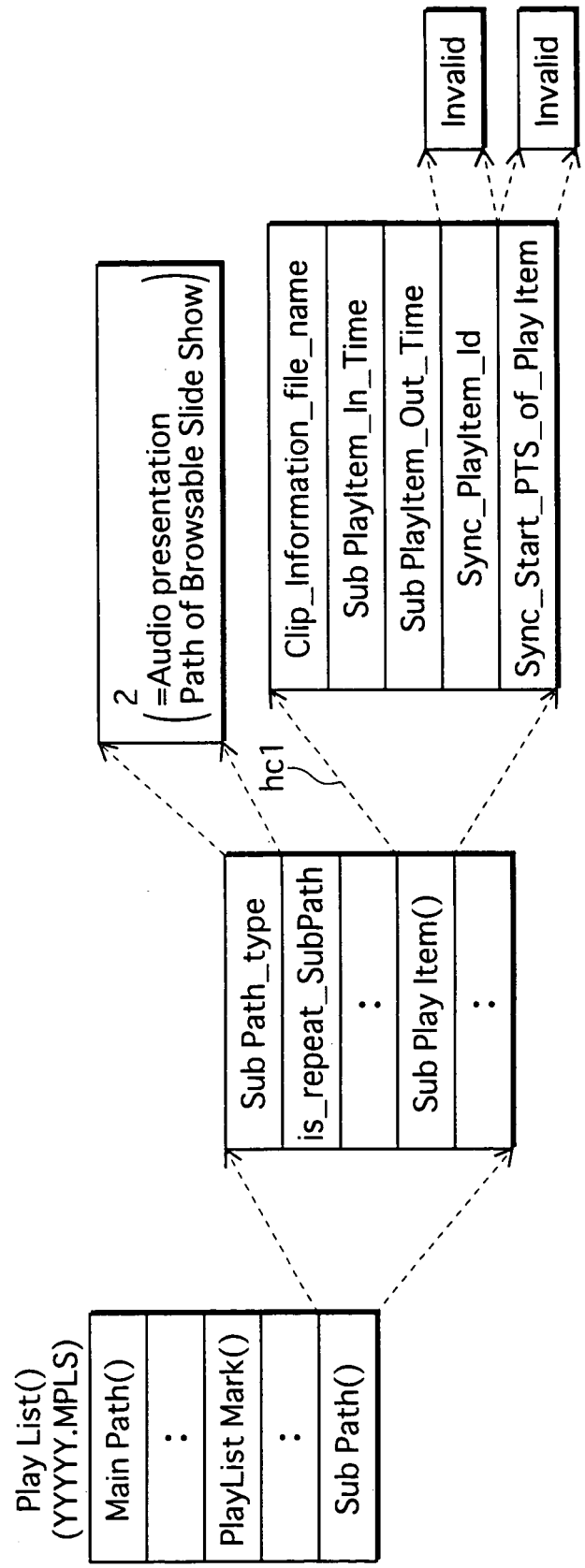
FIG. 9 shows an internal structure of SubPath information.

FIG. 9 shows an internal structure of SubPath information. Lead lines in the figure indicate a detailed structure of SubPath information. As shown in the figure, a SubPath defined by this SubPath information is composed of "SubPath_type" which indicates that the SubPath is an audio playback path, "is_repeat_sub_path" which indicates whether audio playback is to be repeatedly executed, and at least one "SubPlayItem information". Lead lines in the figure indicate a detailed structure of the SubPlayItem information. As shown by arrow hc1, each piece of SubPlayItem information includes "Clip information_file_name", "SubPlayItem_In_time", "SubPlayItem_Out_time", "sync_PlayItem_id" and "sync_Start_PTS_of_PlayItem".

"Clip_information_file_name" is information which uniquely specifies a sub Clip that corresponds to a SubPlayItem, by describing a filename of a piece of Clip information.

"SubPlayItem_In_time" is information which indicates a SubPlayItem start point on a playback time-axis of the sub Clip.

"SubPlayItem_Out_time" is information which indicates a SubPlayItem end point on the playback time-axis of the sub Clip.

"sync_PlayItem_id" is information which uniquely specifies, from among PlayItems that constitute the MainPath, the PlayItem with which the SubPlayItem is to be synchronized. The SubPlayItem_In_time is located on a playback time-axis of the PlayItem specified by this sync_PlayItem_id.

"sync_Start_PTS_of_PlayItem" indicates where a start point of the SubPlayItem specified by the SubPlayItem_In_time is located on the playback time-axis of the PlayItem specified by the sync_PlayItem_id. "sync_PlayItem_id" and "sync_Start_PTS_of_PlayItem" are configured to "Invalid" since the audio playback path of the Browsable SlideShow is not intended for synchronization with the MainPath.

Figure 10:
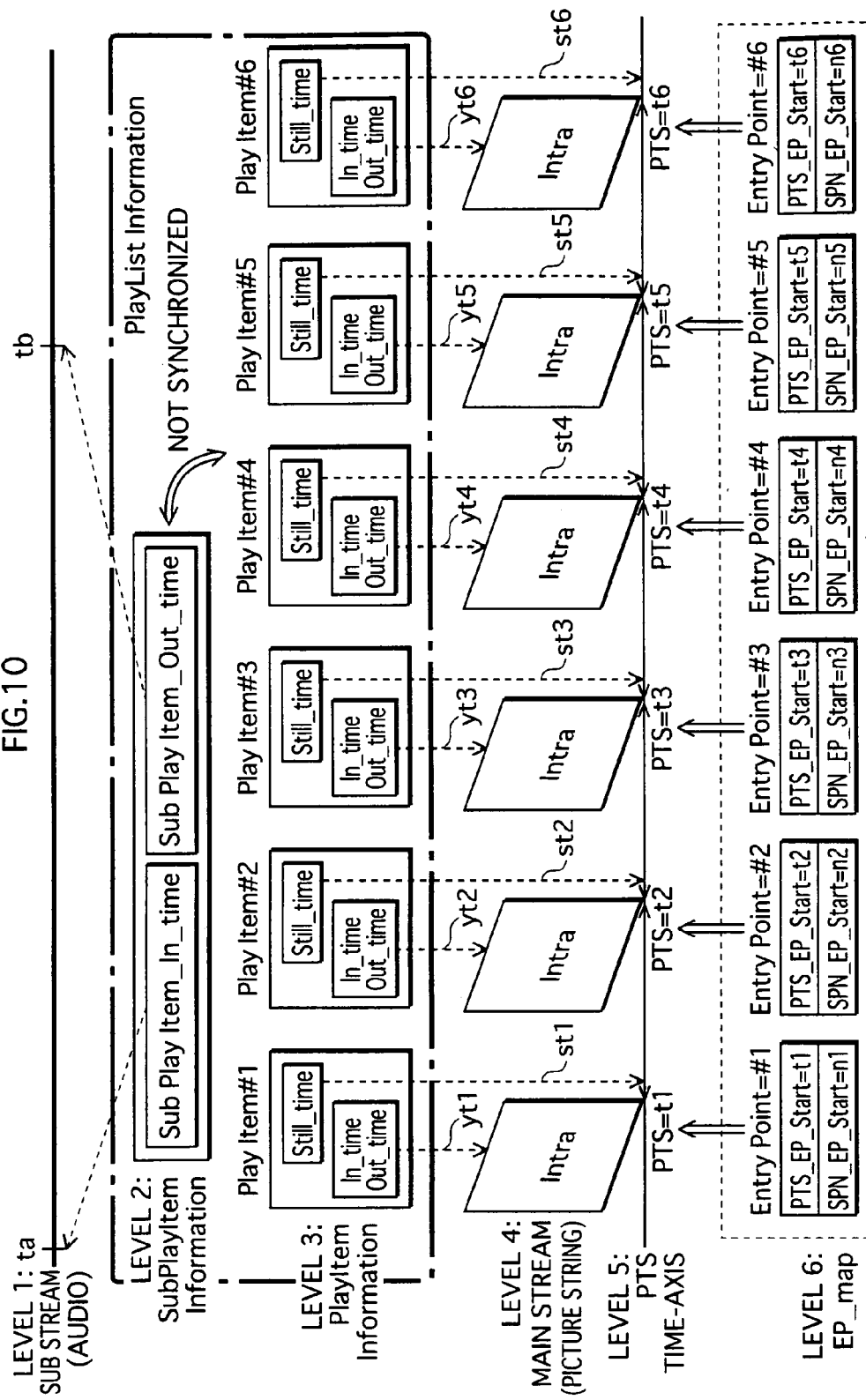
FIG. 10 shows a configuration of SubPlayItem information for constituting the Browsable SlideShow.

FIG. 10 shows configuration of SubPlayItem information for constituting the Browsable SlideShow. In the figure, level 1 indicates an audio stream which is the sub stream, level 2 indicates SubPath information, and level 3 indicates PlayItem information. Given that points ta and tb on the time-axis of the audio stream in level 1 are specified by SubPlayItem_In_time and SubPlayItem_Out_time, playback based on the PlayList information is performed according to the range specified by the SubPlayItem_In_time and SubPlayItem_Out_time. Audio playback is not synchronized with picture data playback since synchronization of the MainPath and the SubPath in the Browsable SlideShow is not intended. SubPlayItem information is used as background music in the Browsable SlideShow.

This completes the description of the optical disc pertaining to the present invention. Next is a description of a playback apparatus pertaining to the present invention.

Internal Structure of the Playback Apparatus

Figure 11:
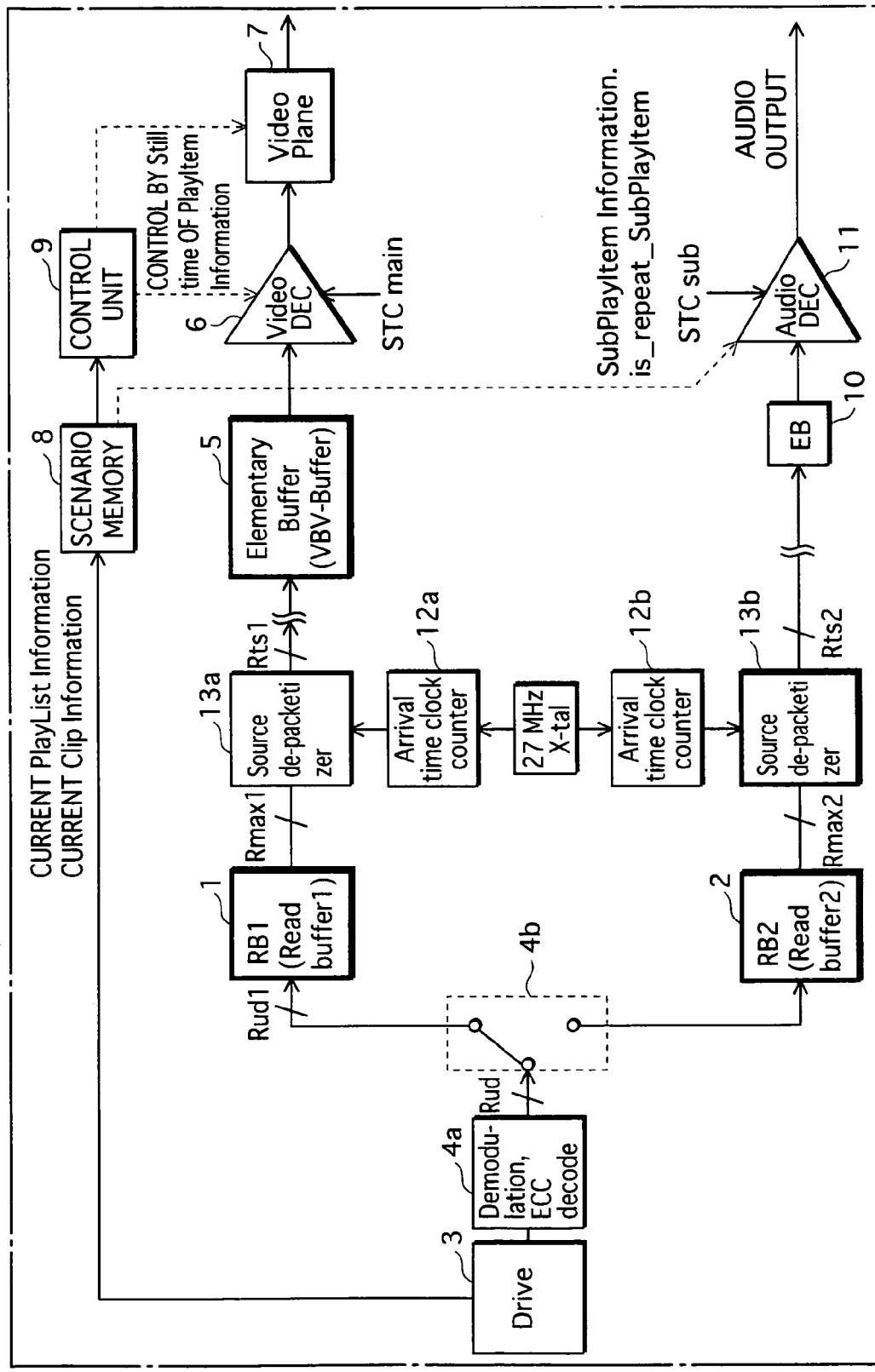
FIG. 11 shows an internal structure of a playback apparatus pertaining to the present invention.

FIG. 11 shows an internal structure of the playback apparatus pertaining to the present invention. The playback apparatus pertaining to the present invention is industrially manufactured based on the internal structure shown in this figure. The playback apparatus pertaining to the present invention is mainly composed of two parts, which are a system LSI and a drive device. The playback apparatus can be industrially produced by mounting these parts in a cabinet of and on a substrate of the device. A system LSI is an integrated circuit having integrated thereon various processors that carry out functions of the playback apparatus. The playback apparatus produced this way includes a Read Buffer 1, a Read Buffer 2, a drive 3, a Demodulation, ECC decode 4a, a switch 4b, an Elementary Buffer 5, a video decoder 6, a video plane 7, a scenario memory 8, a control unit 9, an Elementary buffer 10, an audio decoder 11, Source de-packetizers 13a and 13b, and Arrival Time Clock Counters 12a and 12b.

The Read Buffer 1 is a buffer for storing all or part of picture data in a TS packet state.

The Read Buffer 2 is a buffer for storing all or part of audio data in a TS packet state.

Next is a description of how a capacity of the Read Buffer 1 is set. Here, the capacity of the Read Buffer 1 needs to be set with consideration for a time period necessary for accumulation in the Read Buffer 2. In other words, if Rmax1 is a rate of transfer to the Read Buffer 1, the capacity of the Read Buffer 1 must be set so as to satisfy the following relationship.

$$\text{Read Buffer } 1 = R\text{max}1 \times \text{"time to fill Read Buffer 2 while performing a jump"}$$

Here, a jump is synonymous with a disc seek.

The following considers the "time to fill Read Buffer 2 while performing a jump". Accumulation of TS packets in the Read Buffer 2 is performed at a transfer rate of Rud-Rmax2. This represents a difference between an output rate Rmax2 from the Read Buffer 2 and an input rate Rud to the Read Buffer 2. As such, the time needed to fill the Read Buffer 2 is RB2/(Rud−Rmax2).

When reading data to the Read Buffer 2, consideration must be given to a jump time (Tjump) from the main stream to the sub stream, and a jump time (Tjump) from the sub stream to the main stream, thereby necessitating a time for accumulation in the Read Buffer 2 as follows.

$$2 \times T\text{jump} + RB2/(R\text{ud} - R\text{max}2)$$

Given that Rmax1 is the Read Buffer 1 transfer rate, and all data in the Read Buffer 1 must be output at the transfer rate of Rmax1 in the above-mentioned Read Buffer 2 accumulation time, the size of the Read Buffer 1 is as follows.

$$RB1 \geq R\text{max}1 \times \{2 \times T\text{jump} + RB2/(R\text{ud} - R\text{max}2)\}$$

Using the same process, the capacity of the Read Buffer 2 is as follows.

$$RB2 \geq R\text{max}2 \times \{2 \times T\text{jump} + RB1/(R\text{ud} - R\text{max}1)\}$$

A specific value of the Read Buffer 1 memory size is 1.5 MB or less, and the size of the "Browsing Unit" in the present invention is configured to be smaller than this Read Buffer 1 size.

This completes the description of the Read Buffer 1 and the Read Buffer 2. Next is a description of the drive 3.

The BD-ROM drive 3 performs loading/ejecting of a BD-ROM, and reads picture data and audio data from the BD-ROM. If a size of the picture data is smaller than the Read Buffer 1, the Read Buffer 1 is used to preload the picture data. After preloading, the playback apparatus reads the audio data, and starts playback. The Read Buffer 1 needs to be full at all times, with the exception of its initial state. When subsequent picture data is requested, the drive device jumps to the requested position, reads the picture data, and jumps to a recording position of the audio data. An underflow will not occur in either the Read Buffer 1 or the Read Buffer 2 as long as the output rate Rmax1 from the Read Buffer 1 satisfies the above-mentioned expression. Thus, seamless playback of picture data and audio data is guaranteed.

If a piece of picture data is too large for its entirety to be preloaded in the Read Buffer 1, the drive device reads the picture data over a plurality of separate times. For example, in the case of reading the picture data over two times, the drive device performs a jump to read a first-half portion and a last-half portion in succession. When performing this jump, the drive device is responsible for filling the Read Buffer 1 and the Read Buffer 2. An underflow will not occur in either the Read Buffer 1 or the Read Buffer 2 as long as the output rate Rmax1 from the Read Buffer 1 satisfies the above-mentioned expression. Thus, seamless playback of the picture data and the audio data is guaranteed. Even in this case, the jump for reading the audio stream must be executed when the Read Buffer 1 is full. This is because an underflow can occur in the Read Buffer 1 while performing a seek or reading audio data if accumulation to the Read Buffer 1 is insufficient. This completes the description of the drive 3. Next is a description of the Demodulation/ECC decode 4a and the switch 4b.

The Demodulation, ECC decode 4a performs demodulation and ECC decoding with respect to TS packets read from the drive 3.

The switch 4b outputs TS packets, which have been demodulated and ECC decoded, to either the Read Buffer 1 or the Read Buffer 2. The above were constituent elements for reading data from the BD-ROM.

The following is a description of transfer rates in the playback apparatus.

"Rud" is a read rate from the drive 3, and is specified as 54 Mbps.

"Rud1" is a read rate from the drive 3, and is an input rate to the Read Buffer 1. Rud1=Rud during the period when data is being transferred to the Read Buffer 1, and Rud1=0 during other periods.

"Rts1" is a transfer rate from the Read Buffer 1 to the video decoder 6, and the transfer rate after passing through the Source de-packetizer 13a. "Rts1" is defined as TS_recording_rate in the Clip information.

"Rts2" is a transfer rate from the Read Buffer 2 to the audio decoder 11, and the transfer rate after passing through the Source de-packetizer 13b. "Rts2" is defined as TS_recording_rate in the Clip information.

The following is a description of specific values of Rts1 and Rts2.

A) If the encoding format of the sub stream (application_type=4) in the Browsable SlideShow is not 192 kHz LPCM, that is, if the sub stream is in a 48 kHz/96 kHz LPCM format, the following configurations must be made.

$$TS\_recording\_rate(Rts1) \text{ of main stream} \leq 2 \text{ Mbps}$$

and $$TS\_recording\_rate(Rts2) \text{ of sub stream} \leq 20 \text{ Mbps}$$

B) If the encoding format of the sub stream (application_type=4) in the Browsable SlideShow is 192 kHz LPCM, the following configurations must be made.

$TS\_recording\_rate(Rts1)$ of main stream≤2 Mbps and $TS\_recording\_rate(Rts2)$ of sub stream≤30 Mbps This 30 Mbps substantially corresponds to the value of a 24-bit/192 kHz sampled, 6 channel LPCM stream to which the overhead of MPEG system streaming has been added.

Here, the TS_recording_rate for an application_type=1 AVClip (Movie Application) and an application_type=2 AVClip (Time based Slide Show Application is set to 48 Mbps or less. Compared with these application_type=1, 2 AVClips, the TS_recording_rate of the main stream in the Browsable SlideShow is no more than 2 Mbps, which means that it is being kept extremely low. The TS_recording_rate of the main stream in the Browsable SlideShow is given a low setting of 2 Mpbs in consideration of not interrupting playback of the audio stream. Lowering Rmax1 in this way means that the transfer period necessary for outputting data stored in the Read Buffer 1 to the Elementary Buffer 5 becomes extremely long.

"Rmax1" is a transfer rate from the Read Buffer 1 to the video decoder, and the transfer rate before passing through the Source de-packetizer 13a. "Rmax1" is calculated as TS_recording_rate×192/188. Data in the Read Buffer 1 is extracted from the Read Buffer 1 at this Rmax1. Here, (192/188) is a conversion factor for converting the transfer rate defined in a decoder peripheral into a transfer rate of a drive device peripheral, and is based on the ratio of the byte count of the extra_header-attached TS packet (192 bytes) to the byte count of the TS packet itself (188 bytes). Here, the drive device peripheral is a portion targeted for transfer of extra_header-attached TS packets, and the decoder peripheral is a portion targeted for transfer of TS packets from which extra_header has been removed.

The decoder peripheral has a structure based on an MPEG2 decoder model, and the transfer rate is defined based on the MPEG2 decoder model as well.

If the transfer rate that was defined based on the MPEG2 decoder model is treated as equal to the transfer rate in the drive device peripheral, and used in calculations, it is necessary to multiply the transfer rate defined in the decoder peripheral by the above-mentioned conversion factor. This completes a description of the significance of 192/188. The notation "192/188" appears frequently hereinafter, and should be interpreted as meaning the above conversion factor.

"Rmax2" is a transfer rate from the Read Buffer 2 to the audio decoder 11, and the transfer rate before passing through the Source de-packetizer 13b. "Rmax2" is calculated as TS_recording_rate×192/188.

This completes the description of transfer rates in the playback apparatus.

The following is a detailed description of buffer statuses of the Read Buffer 1 and the Read Buffer 2, which are constituent elements of the playback apparatus.

Figure 12:
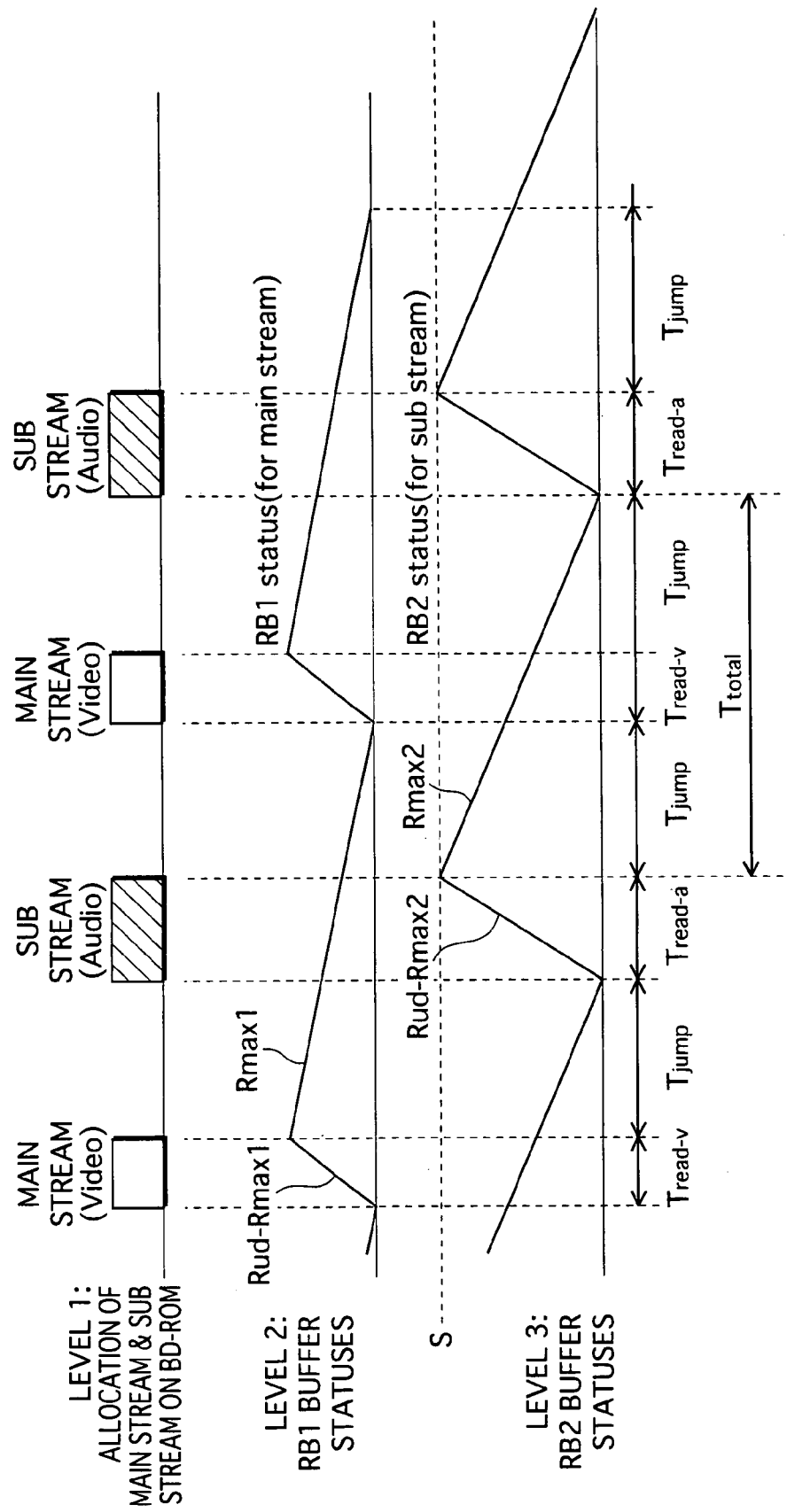
FIG. 12 shows changes in buffer statuses of a Read Buffer 1 and a Read Buffer 2.

FIG. 12 shows changes in buffer statuses of the Read Buffer 1 and the Read Buffer 2. Level 1 shows a disposition of the main stream and the sub stream on the BD-ROM, level 2 shows buffer statuses of the Read Buffer 1, and level 3 shows buffer statuses of the Read Buffer 2. The buffer statuses in level 2 have a repeating structure including monotone increases according to Rud-Rmax1 and monotone decreases according to Rmax1. Rud-Rmax1 is a difference between speeds of input and output in the Read Buffer 1, and shows a monotone increasing slope.

Rmax1 is shown by a monotone decreasing slope. These times are indicated as the following four times in the figure.

| | |
|---|---|
| Tjump: | seek time |
| Tread-v: | time to read picture data |
| Tread-a: | time to read audio data |
| Ttotal: | time to output picture data |

There are two types of "Tjump": the disc seek time from after audio data has been read (Tread-a) until picture data is accessed, and the seek time from after picture data has been read (Tread-v) until audio data is accessed. These two types of Tjump are assumed to be 1 second. This 1 second is the time in which a seek substantially half the distance (half-stroke) of a 12 cm BD disc can be performed.

"Tread-v" denotes a time period in which picture data read from the BD-ROM drive 3 is stored in the Read Buffer 1. The accumulation rate to the Read Buffer 1 is the value (Rud−Rmax1), which is the read rate Rud minus the provision rate Rmax1 to the Elementary Buffer 5.

Assuming that the size of the picture data is 1.2 MB (the size of the Elementary Buffer), Tread-v can be obtained using the following expression.

$$Tread\text{-}v = 1.2 \text{ MB}/(Rud - Rmax1)$$

$$= 1.2 \text{ MB}/(54 \text{ Mbps} - (192/188) \times 2 \text{ Mbps}) \approx 190 \text{ msec}$$

"S" indicates a sufficient accumulation amount to be accumulated to the Read Buffer 2 for switching of the picture data (i.e., reading a new piece of picture data, decoding, and performing display). The significance of determining this "S" is to prevent an underflow of the data accumulation amount of the Read Buffer 2. If an underflow occurs in the Read Buffer 2, this indicates that data cannot be supplied to the audio decoder, that is to say, this means that audio playback will be interrupted.

The accumulation amount S of the Read Buffer 2 for performing picture data playback can be obtained using the following expression.

$$S = Rmax2 \times (Tjump + Tread\text{-}v + Tjump)$$

This expression represents that it is sufficient for audio data to be provided to the audio decoder at a predetermined transfer rate during the time period required for reading of the audio data to be stopped (Tjump), a seek to picture data (Tread-v), and a seek to the position where reading of the audio data was stopped (Tjump).

Calculation can be performed if Rmax2 is (192/188)×30 Mbps, and Tread-v=190 msec, whereby the accumulation amount S is as follows.

$$S = (192/188) \times 30 \text{ Mbps} \times 2190 \text{ msec } (=1000 \text{ msec} \times 2 + 190)$$

"Tread-a" is a period during which audio data read from the BD-ROM drive 3 is stored in the Read Buffer 2. Given that the accumulation rate to the Read Buffer 2 is the value (Rud−Rmax2), which is the read rate Rud minus the provision rate Rmax2 to the decoder, Tread-a is as follows.

$$Tread\text{-}a = S/(Rud - Rmax2)$$

"Ttotal" is a period during which picture data is transferred from the Read Buffer 1 to the Elementary Buffer 5 at the provision rate Rmax1 to the Elementary Buffer 5. This period is obtained from the calculation Tjump+Tread-a+Tjump.

Total=Tjump+Tread-a+Tjump

=2×Tjump+S/Rud−Rmax2

Given that Tjump is 1 second, the output rate Rmax2 from the Read Buffer 2 is (198/188)×30 Mbps, and the Rud is 54 Mbps, the input rate Rud-Rmax2 to the Read Buffer 2 is as follows.

Rud−Rmax2=54 Mbps−(198/188)×30 Mbps

If this is substituted in the above-mentioned expression:

$$Ttotal = Tjump + Tread - a + Tjump =$$
$$2000 \text{ msec} + S/(54 \text{ Mbps} - (198/188) \times 30 \text{ Mbps} =$$
$$2000 \text{ msec} + 30 \text{ Mbps} \times (192 \times 188) \times 2190$$
$$\text{msec}/(54 \text{ Mbps} - (198/188) \times 30 \text{ Mbps}) \cong 5000 \text{ msec}$$

According to the above calculation, if Rmax1 is 192/188×2 Mbps, picture data is transferred to the Elementary Buffer 5 over the long period of approximately 5 seconds.

The following processing is repeatedly performed: data stored in the Read Buffer 1 is output to the Elementary buffer 5 over the period Tjump+Tread-a+Tjump, during which a seek to the area where audio data is stored is performed, the audio data is read, and a seek back to the area where the picture data is recorded is performed.

Given that accumulation to the Elementary Buffer 5 takes approximately 5 seconds in the above repeated operations, this period is a VBV-delay for the Elementary Buffer 5.

Here, audio playback will not be interrupted as long as the Read Buffer 1 is filled over the period Tread-v, and transfer to the Elementary Buffer 5 is completed during 5 seconds. The following examines what happens if picture data cannot be read to the Read buffer 1 over a period of 190 msec.

FIG. 13A shows transferring of picture data if the picture data is 1.2 MB in size.

Assuming that the input rate Rud-Rmax1 is as mentioned above, reading to the Read Buffer 1 can be performed in 190 msec if the picture data is 1.2 MB as shown in FIG. 13A. If the picture data is 2.2 MB in size, however, the picture data cannot be stored in the Read Buffer 1 in 190 msec. In order to have seamless playback, Tjump+Tread-a+Tjump must follow an instance of Tread-v. As such, if the picture data cannot be read in one instance of Tread-v, Tjump+Tread-a+Tjump must pass before the next instance of Tread-v. Since Tjump+Tread-a+Tjump must pass for the picture data to be stored in the Read Buffer 1 and transferred to the Elementary Buffer 5, completely filling the Elementary Buffer 5 with the picture data will ultimately take a total time of 5 seconds+5 seconds. FIG. 13B shows transferring of picture data if the picture data is 2.2 MB in size.

If the period including Tread-v and Tjump+Tread-a+Tjump is called a "cycle", and all of the picture data cannot be read to the Read Buffer 1 in one instance of Tread-v, the read period becomes longer, such as 2 or 3 cycles.

All of the picture data may not be able to be read in one instance of Tread-v since the Read Buffer 1 is limited to being under a certain size due to the constraint of seamless audio playback. If the picture data is transferred to the Elementary Buffer 5 over a number of instances, the transfer period per one instance is determined by the above-mentioned period Tjump+Tread-a+Tjump, whereby the period necessary for transfer of all of the picture data increases at an interval of 5 seconds, such as 5 seconds, 10 seconds, and 15 seconds. This increase of the transfer period effects the Elementary Buffer 5 in that the VBV-delay becomes longer. This completes the description of the reading of data by the drive 3, and buffer statuses of the Read Buffer 1 and the Read Buffer 2.

The following describes constituent elements for decoding video (the Elementary Buffer 5, the Video decoder 6, a video plane 7, a scenario memory 8, and a control unit 9).

The Elementary Buffer 5 is a buffer which stores pictures in an encoded state (I pictures, B pictures, and P pictures).

The Video decoder 6 decodes a picture stored in the Elementary buffer 5 to obtain a picture in an uncompressed state, and outputs the uncompressed picture.

The video plane 7 is a plane for storing a non-compression form at picture. A plane is a memory area for storing one screen-worth of pixel data in a playback apparatus. The resolution of the video plane 7 is 1920×1080, and the picture data stored in the video plane 7 is constituted from pixel data expressed as 16-bit YUV values.

The scenario memory 8 is a memory for storing current Clip information and current PlayList information. Current Clip information denotes, from among the pieces of Clip information recorded on the BD-ROM, the piece of Clip information that is the current target of processing. Current PlayList information denotes, from among the pieces of PlayList information recorded on the BD-ROM, the piece of PlayList information that is the current target of processing.

The control unit 9, which is composed of an instruction ROM and a CPU, performs overall control of the playback apparatus according to the current Clip information and the current PlayList information stored in the scenario memory.

The following is a more detailed description of the Elementary Buffer 5, which is one of the constituent elements.

FIGS. 14A and 14B show buffer statuses of the Elementary Buffer 5 if transfer from the Read Buffer 1 is performed as in FIGS. 13A and 13B. The buffer statuses of the Elementary Buffer 5 include monotone increases according to Rbx, and monotone decreases at decoding points. This Rbx is the speed of input to the Elementary Buffer 5. On the other hand, output from the Elementary Buffer 5 to the decoder may be considered to be instantaneous, and the slope of the monotone decrease is therefore substantially 0.

In the Elementary Buffer 5, the period corresponding to Tjump+Tread-a+Tjump of the Read Buffer is VBV-delay. VBV-delay "VBV (Video Buffer Verify) delay" is a delay in time from when data to be decoded starts being accumulated to the buffer until the accumulation to the buffer is complete and decoding has been performed. Given that the transfer period to the Elementary Buffer 5 increases by an interval of 5 seconds, such as +5 seconds and +10 seconds in the Browsable SlideShow, the VBV-delay also increases by an interval of +5 seconds, such as +5 seconds and +10 seconds.

Here, the VBV-delay of the Elementary Buffer 5 is the same length as Tjump+Tread-a+Tjump of the Elementary Buffer 5, but the point of output from the Read Buffer and the point of input to the Elementary Buffer 5 do not match. This is because these inputs/outputs with respect to the buffers are asynchronous.

Given that the transfer of individual pieces of picture data to the Elementary Buffer 5 in FIG. 14A requires a period of 5 seconds, the VBV-delay is also 5 seconds.

In contrast, given that reading the picture data requires two cycles, and the transfer of individual pieces of picture data to the Elementary Buffer 5 requires a period of 10 seconds in FIG. 15B, the VBV-delay is also 10 seconds.

Still_time of the PlayItem information is configured to cover this variation in VBV-delay for each piece of picture data.

FIGS. 15A and 15B show configurations of Still_times in PlayItem information if the VBV-delay of FIGS. 14A and 14B occur in the Elementary Buffer 5. The lower portions of FIGS. 15A and 15B are the same as the buffer statuses shown in FIGS. 14A and 14B. The upper portions are configurations of the PlayList information.

In_time and Out_time of an individual piece of PlayItem information in PlayList information indicate a picture to be output to the video decoder at the decoding point. The Still_time belonging to this PlayItem information is configured to show the VBV-delay of the piece of picture data that is subsequent to the piece of picture data specified by the In_time and Out_time.

In FIG. 15A the VBV-delay for reading the piece of picture data subsequent to the piece of picture data specified by the In_time and Out_time of PlayItem information #1 to the Elementary Buffer 5 is 5 seconds. As such, the Still_time of PlayItem information #1 is set to 5 seconds. The Still_times of PlayItem information #1 to PlayItem information #3 are all set to 5 seconds in FIG. 15A since the VBV-delays of all the pieces of picture data are 5 seconds.

On the other hand, in FIG. 15B the VBV-delay for reading the piece of picture data subsequent to the piece of picture data specified by the In_time and Out_time of PlayItem information #1 to the Elementary Buffer 5 is 10 seconds. The Still_time of PlayItem information #1 is set to 10 seconds in this way since reading the next piece of picture data requires a long period.

If the Still_times of the PlayItem information are configured as above, and the Video decoder 6 performs display control based on these Still_times, the still display of the current piece of picture data is continued until the next piece of picture data is stored in the Elementary Buffer 5. Even if the VBV-delay of the picture data varies such as 10 seconds, 5 seconds, 15 seconds, audio playback during that period is not interrupted due to this continuation of the still display.

During authoring, a simulation of the Elementary Buffer 5 and the Read Buffers 1 and 2 is performed, and the VBV-delays when reading pieces of picture data are pre-obtained in order to configure the Still_times of the PlayList information. The Still_time of each piece of PlayItem information is configured according to these VBV-delays. Doing this enables the display of the subsequent pieces of picture data to be started without interfering with reading of the audio stream.

The following describes the specific calculation performed when defining the Still_time based on the VBV-delay as above.

"next browsing-unit" denotes the piece of picture data referenced to by the PlayItem information after the PlayItem information to which Still_time belongs (called the current PlayItem info). The size of the next browsing-unit, which is stored as a plurality of TS packets, is expressed as "size of next browsing-unit", and the transfer rate for transferring the "size of next browsing unit" is called "TS_recording_rate". "TS_recording_rate" is a value representing the transfer rate Max1 of the next browsing-unit, and is defined in a field called "TS_recording_rate" in the Clip information corresponding to the AVClip that includes the next browsing-unit.

The picture data still period displayed in the Still_time can be derived from the following Expression (1) if the size of next browsing-unit and the TS_recording_rate are used.

$$\text{Still\_time} = (\text{size of next browsing-unit}) \times (188/192/ \text{Ts\_recording\_rate}) \quad \text{Expression (1)}$$

Figure 16:
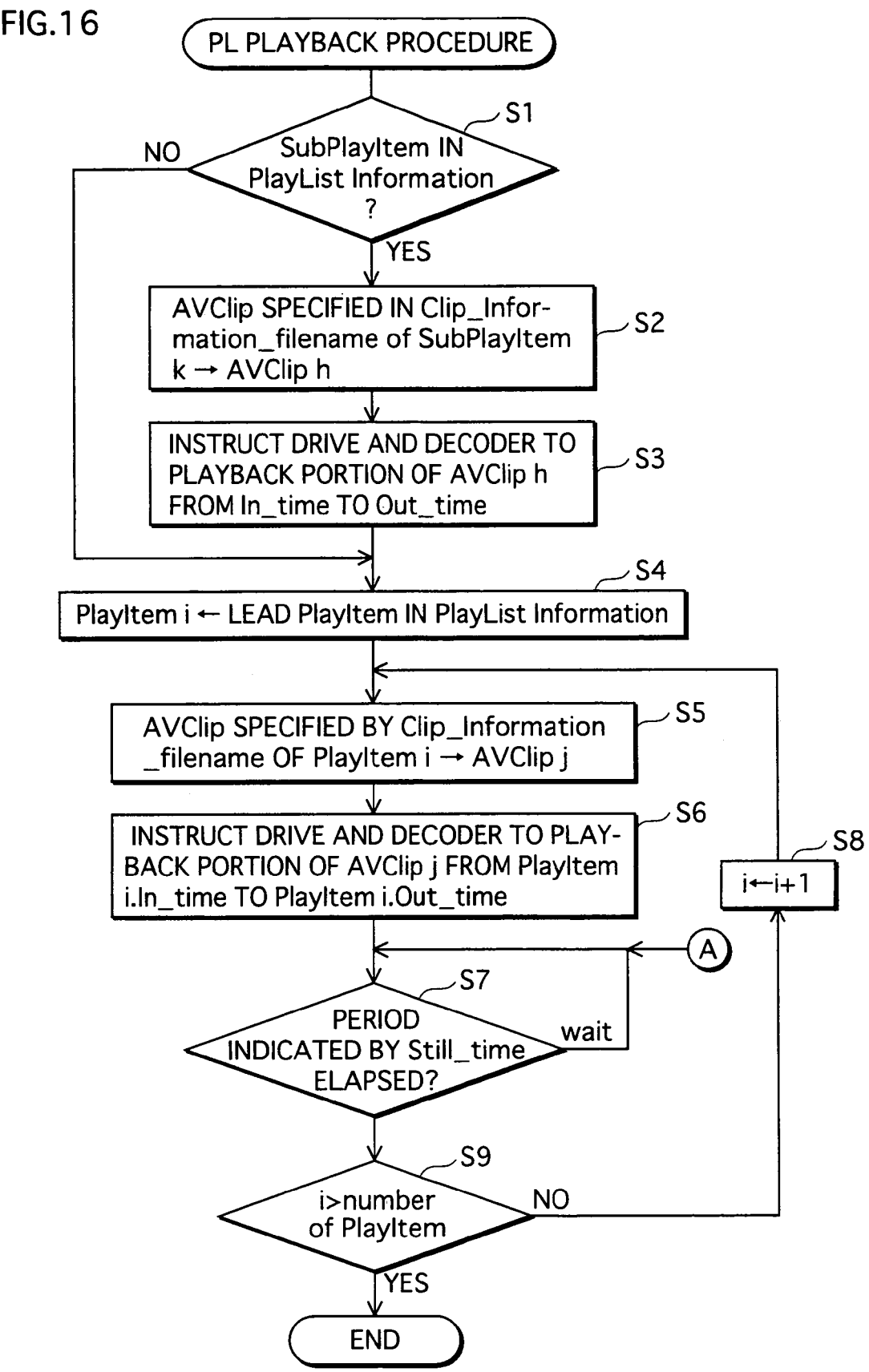
FIG. 16 is a flowchart showing a playback procedure performed by a control unit 9.

Playback control based on Still_times in the PlayItem information is performed in accordance with the flowchart of FIG. 16.

FIG. 16 is a flowchart showing a playback procedure performed by the control unit 9. In step S1 of this flowchart, the control unit 9 judges whether the PlayList information to be played back includes SubPath information. If SubPath information is included, the control unit 9 sets, to AVCliph, an AVClip described in Clip_information_file_name of SubPlayItemk in the SubPath information (step S2), and instructs the drive apparatus and the decoder to playback a portion of the AVCliph from SubPlayItem_In_time to SubPlayItem_Out_time (step S3).

In the following processing, the control unit 9 sets the leading PlayItem information in the PlayList information as PlayItem information i (step S4), and executes loop processing from step S5 to step S9. The control variable in the loop processing of steps S5 to S9 is a variable i. Processing which increments the control variable i (step S8) after the processing of steps S5 to S7 have been performed is executed until the variable i surpasses the PlayItem count (Number of PlayItems) (step S9).

Next is a description of the processing of steps S5 to S9. In this processing, the control unit 9 sets, to AVClipj, the AVClip described in Clip information_file_name of the PlayItem information i (step S5), and instructs the drive apparatus and the decoder to playback a portion of the AVClipj from PlayItem i. In_time to PlayItem i. Out_time (step S6).

The control unit 9 then waits for the time shown in Still_time of the PlayItem information i to pass (step S7), and processing moves to step S9 when the time has passed. The Still_time is a time greater than or equal to the VBV-delay for reading the subsequent piece of picture data, and the subsequent piece of picture data is therefore read during this time. This enables the kind of display control of FIG. 15 to be performed.

Previous and following pieces of picture data can be played back using functions such as a chapter skip or a chapter search since the individual pieces of picture data that constitute the slideshow are indicated using PlayItem information and PLMark information.

The chapter search function specifies from among the pieces of PlayItem information, a piece of PlayItem information corresponding to ref_to_PlayItem_Id described in the PLMark information, and performs a random access in the AVClip defined by the specified piece of PlayItem information from a position that is indicated in mark_time_stamp described in the PLMark information. At this time, the control unit 9 specifies from among a plurality of Entry Points, the Entry Point having a PTS_EP_start closest to mark_time_stamp described in the PLMark information, and causes playback to be performed from the I picture address corresponding to SPN_EP_start of the specified Entry Point.

The chapter skip specifies a piece of PLMark information that defines a chapter directly before or directly after the chapter at the current playback position, and performs a chapter search to the chapter defined by the specified PLMark information.

Figure 17:
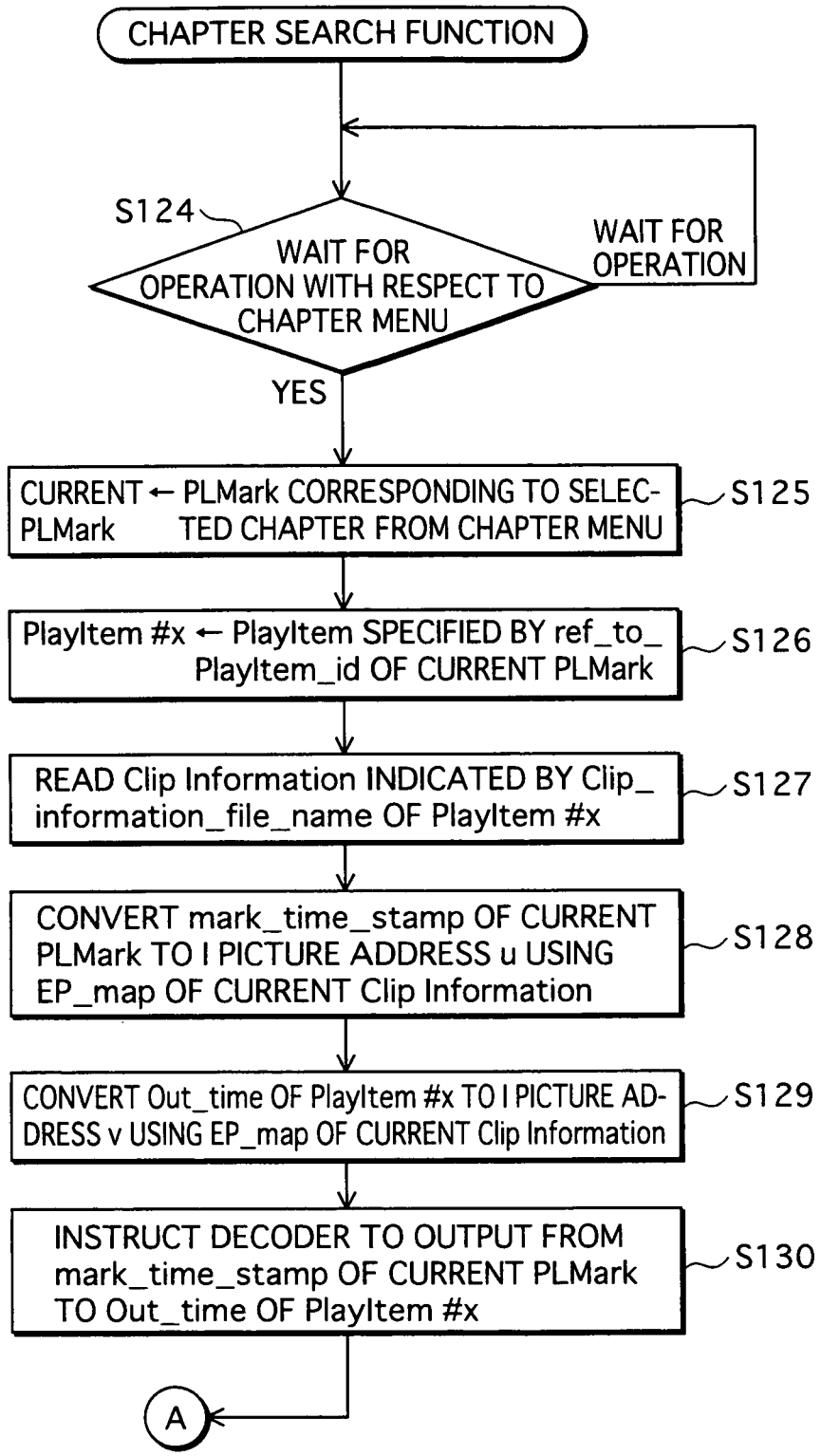
FIG. 17 is a flowchart showing a chapter search processing procedure.

The control unit 9 performs processing in accordance with the flowchart shown in FIG. 17 to execute this chapter search and chapter skip. FIG. 17 is a flowchart showing a chapter search processing procedure.

In this flowchart, the control unit 9 first waits for selection of a chapter from a chapter menu (step S124), and, when the chapter selection is performed, sets the PLMark information pertaining to the selected chapter as the current PlayListMark (step S125). In step S126, a PI described in ref_to_Play- Item_Id of the current PlayListMark is set to PlayItem#x, and a piece of Clip information indicated by Clip_information_file_name of the PlayItem#x is read in step S127. In step S128, mark_time_stamp of the current PlayListMark is converted to an I picture address u using the EP_map of the current Clip information.

Figure 18:
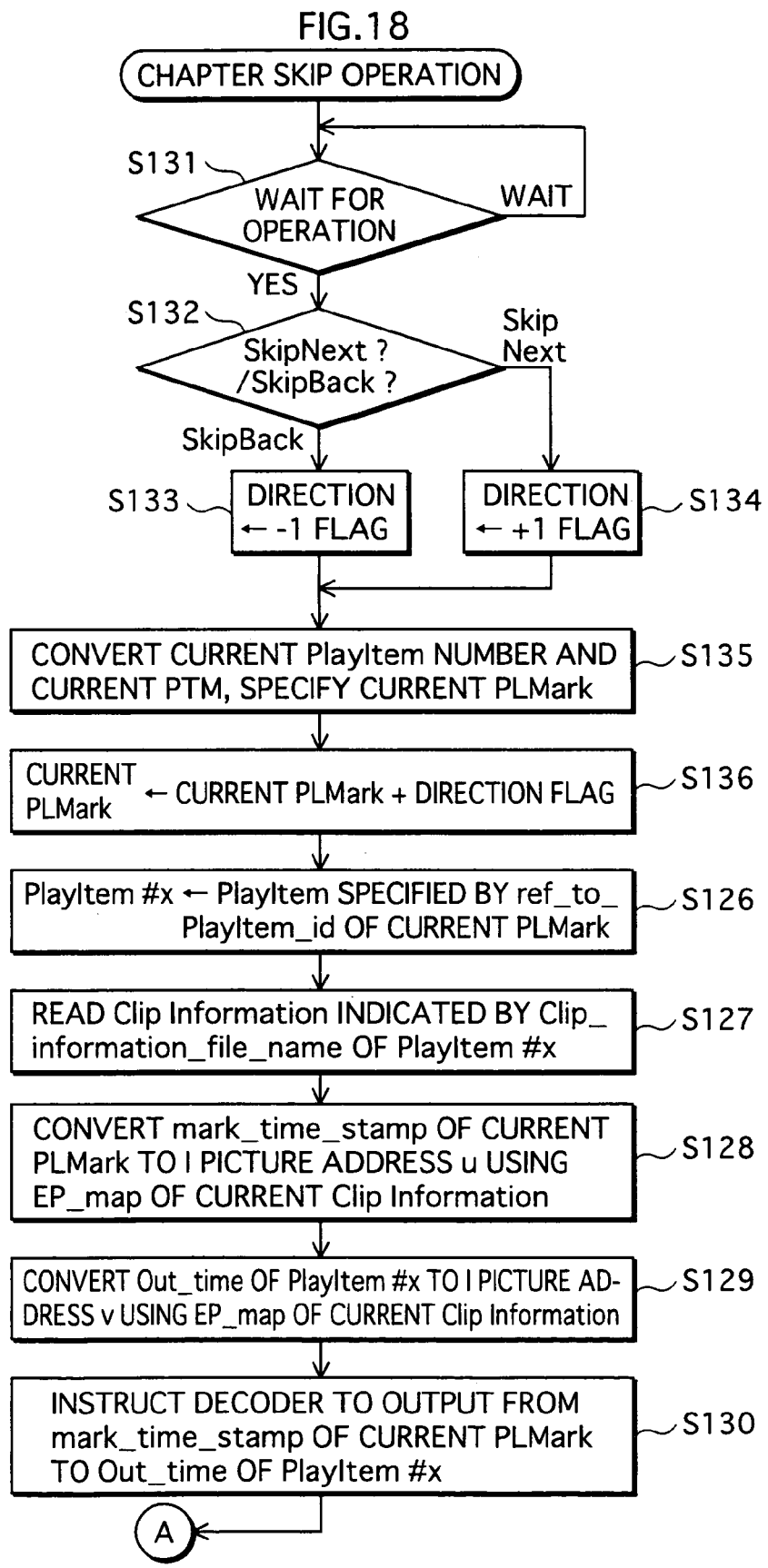
FIG. 18 is a flowchart showing a chapter skip processing procedure.

On the other hand, Out_time of the PlayItem#x is converted to an I picture address v in step S129 using the EP_map of the current Clip information. The decoder is instructed in step S130 to output from mark_time_stamp of the current PlayListMark to Out_time of the PlayItem#x. Processing then moves to step S7 of FIG. 16, and waits for Still_time to pass. This completes the chapter search processing procedure. Next is a description of a chapter skip processing procedure. FIG. 18 is a flowchart showing the chapter skip processing procedure.

In step S131, the control unit 9 waits for an operation of a SkipNext key or a SkipBack key of the remote control. If the operation is performed, step S132 is executed. In step S132, the control unit 9 judges whether the SkipNext key or the SkipBack key was pressed, and a direction flag is set to −1 in step S133 if the SkipBack key was pressed, and the direction flag is set to +1 in step S134 if the SkipNext key was pressed.

In step 135, a current PI and a current PTM are converted, and a current PLMark is specified. In step S136, a number of the current PLMark is set to the current PLMark number plus a value of the direction flag. If the SkipNext key was pressed, the PLMark is incremented since the direction flag has been set to +1. If the SkipBack key was pressed, the current PLMark is decremented since the direction flag has been set to −1. If the PLMark information is set in this way, reading of TS packets is performed by executing the processing procedure of steps 126 to S130, similarly to FIG. 17.

This completes the description of constituent elements pertaining to video playack.

Next is a description of constituent elements that perform audio playback (the Elementary Buffer 10 and the audio decoder 11).

The Elementary Buffer (EB) 10 is a buffer lhat Mores PES packets constituting an audio stream.

The audio decoder 11 decodes PES packets output from the Elementary Buffer 10, and outputs audio data in a non-compression format. Playback of the audio data will not be interrupted even if there is a chapter skip operation. In other words, picture data can be skipped forward or backward without interrupting audio playback. This is made possible by independent STC control. During this chapter skip operation, the video decoder restarts playback while referencing STCmain. As a result, audio playback is made independent of the chapter skip operation. If is_repeat_SubPlayItem information of the SubPath information is set to 1, audio playback is repeated. STCsub may be reset when audio playback is repeated.

This completes the description of constituent elements for audio playback.

Last is a description of constituent elements (Arrival Time Clock Counters 12a and 12b, and Source de-packetizers 13a and 13b) which lie between the Read Buffer 1, the Read Buffer 2 and the Elementary Buffer 5.

The Arrival Time Clock Counters 12a and 12b generate an Arrival Time Clock based on a 27 MHz crystal oscillator (27 MHz X-tal). The Arrival Time Clock is a clock signal that defines a time-axis to be a reference for an ATS attached to a TS packet.

The Source de-packetizers 13a and 13b detach TP_extra_header from each of the TS packets that constitute the Aligned Unit when an Aligned Unit composed of 32 sectors is read from the BD-ROM, and output only the TS packets. Output by the Source de-packetizers 13a and 13b is performed when the time measured by the Arrival Time Clock Counters 12a and 12b reaches the ATS shown by TP_extra_header. Given that the output of the TS packets is performed in accordance with the ATS, TS packet output is performed in accordance with the current time measured by the Arrival Time Clock even if reading from the BD-ROM is performed at different speeds such as 1× speed or 2× speed.

Aside from these constituent elements, there are also constituent elements called a PID filter, a Transport Buffer and a Multiplexed Buffer that lie between the Read Buffer 1, the Read Buffer 2 and the Elementary Buffer 5. These constituent elements, however, are not depicted in the figure since their depiction would be complicated.

According to the present embodiment as above, still display is performed for the period shown by Still_time since VBV-delay when reading an audio stream is used as a guide for Still_time in the PlayList information; and audio stream playback, which is performed at the same time, is not interrupted if display of the subsequent piece of picture data is delayed.

This enables the realization of slideshow playback without interruptions in audio. There is no need to preload picture data in this slideshow, thereby enabling the low-cost manufacture of a playback apparatus that realizes slideshow playback using high definition picture data.

Embodiment 2

The main stream of embodiment 1 was described as being constituted from only a video stream. Embodiment 2 relates to improvements in a case of other data being multiplexed with this main stream.

Figure 19:
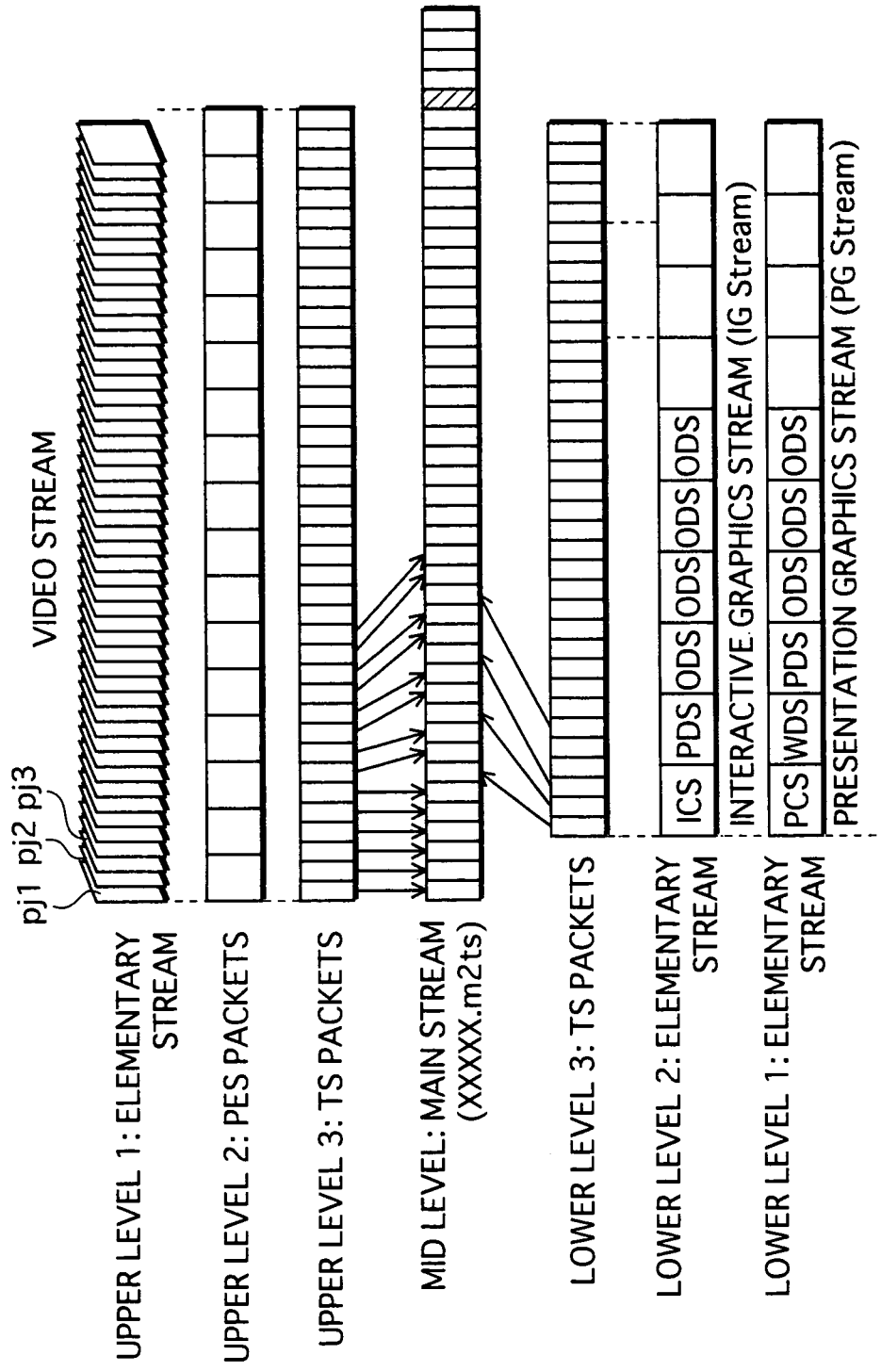
FIG. 19 schematically shows how a main stream pertaining to embodiment 2 is constituted.

FIG. 19 schematically shows how the main stream pertaining to embodiment 2 is constituted. An AVClip (mid level), which is the main stream, is constituted from TS packets (upper level 3 and lower level 3) that have been multiplexed together. The TS packets include TS packets (upper level 3) obtained by converting a video stream (upper level 1) that is composed of a plurality of picture frames (pictures pj1, pj2 and pj3) to a PES packet string (upper level 2), and further converting the PES packet string to TS packets (upper level 3); and TS packets (lower level 3) composed of a subtitle-related presentation graphics stream (PG stream of lower level 1) and an interactive graphics stream (IG stream of lower level 1).

The PG graphics stream is a graphics stream that constitutes subtitles for a plurality of languages. The IG stream is a graphics stream that realizes interactive control, and includes graphic data constituting GUI parts such as a menu, button and the like, and a command (navigation command) to cause the playback apparatus to perform execution. This PG stream and IG stream are associated data to be displayed in synchronization with the picture data.

Figure 20:
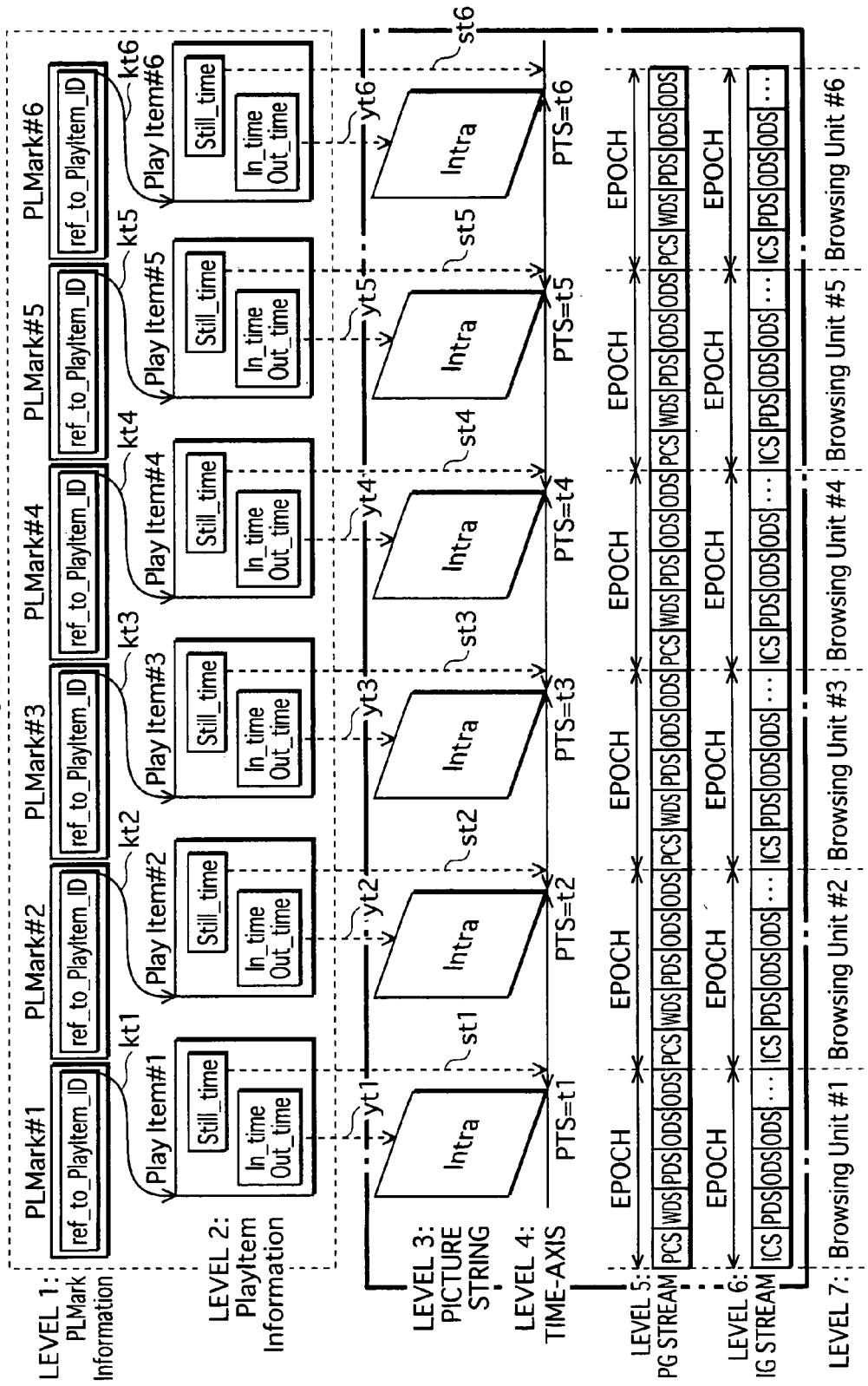
FIG. 20 shows an internal structure of the PlayList information and the AVClip.

FIG. 20 shows an internal structure of PlayList information and the AVClip. In this figure, levels 1 and 2 show PlayList information, and levels 3, 4 and 5 show the video stream, the IG stream and the PG stream which have been multiplexed into the AVClip. Level 7 shows playback units constituted from picture data and function segments. These playback units are called Browsing Units in embodiment 2. FIG. 21A shows an internal structure of a Browsing Unit. This Browsing unit is composed of at least one piece of picture data, a function segment constituting an Epoch in the PG stream, and a function segment constituting an Epoch in the IG stream.

FIG. 21B shows settings of Composition_State which is an element of both the PCS and the ICS. Composition_States of the PCS and ICS in a Browsing Unit are configured to show Epoch Start. As a result, an Epoch is completed in each of the Browsing Units.

The Browsing Units are constrained by the following if the video stream includes an integral number of Browsing Units. If the encoding method of the picture data is MPEG2-Video, each Browsing Unit includes a single piece of picture data or at least one GOP that is concluded by a sequence end code. If the encoding method is MPEG4-AVC, each Browsing Unit includes at least one piece of picture data concluded by a stream end code. FIG. 21C shows from what kind of packet string a Browsing Unit is constituted. The TS packet at the head of each Browsing Unit stores a portion of the video stream data. The function segments that constitute the PG stream and the IG stream follow this packet storing the portion of the video stream. The first I picture/IDR picture PTS in each Browsing Unit is either the I picture/IDR picture PTS or the ICS PTS with the lowest value.

This completes the description of the Browsing Units. Next is a description of the function segments belonging to the Browsing Units.

A single Browsing Unit includes completed Epochs. An Epoch is composed of a series of function segments such as a PCS (Presentation Control Segment), a PDS (Pallet Definition Segment), a WDS (Window Definition Segment), an ODS (Object Definition Segment) and an END (END of display set segment).

The ODS (Object Definition Segment) is a function segment that defines graphics data which is a subtitle.

The WDS (Window Definition Segment) is a function segment that defines a rendering area of the graphics data on the screen, and the PDS (Palette Definition Segment) is a function segment that defines color for rendering the graphics data.

The PCS (Presentation Control Segment) is a function segment that defines page control of the subtitle display. The page control includes Cut-In/Out, Fade-In/Out, Color Change, Scroll and Wipe-In/Out, and performing the page control of the PCS enables the display effect of erasing a certain subtitle and displaying the next subtitle.

Figure 22:
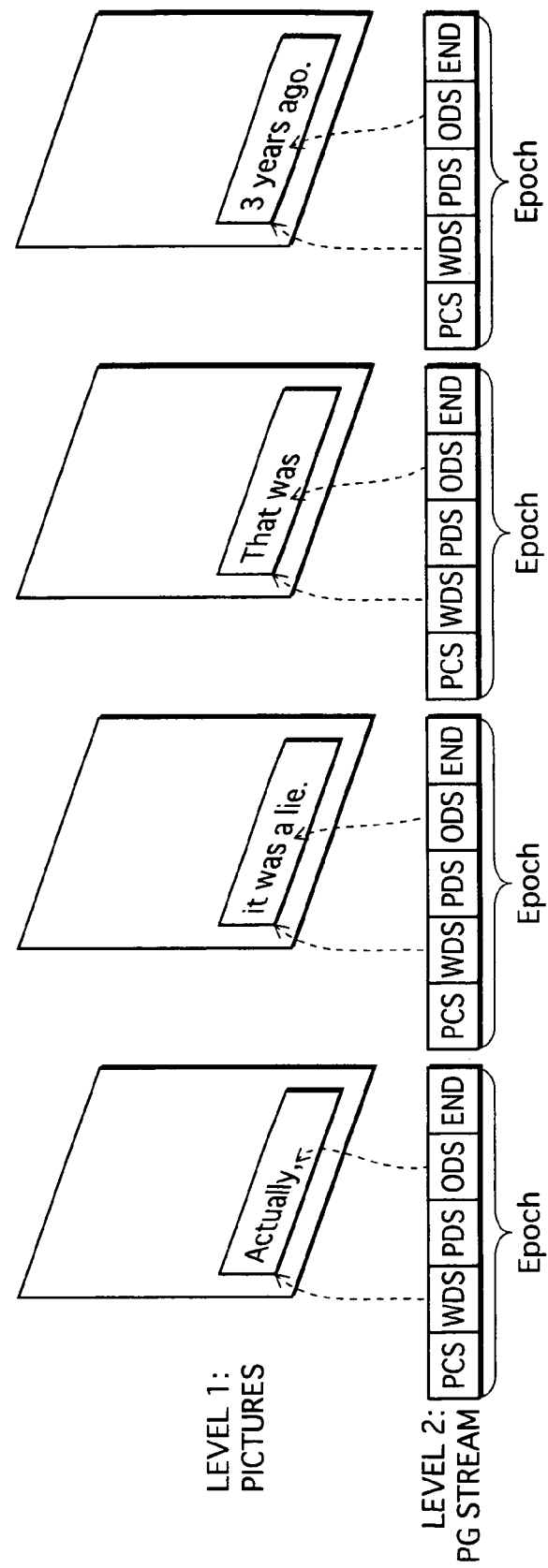
FIG. 22 shows exemplary subtitle control using the PCS.

FIG. 22 shows exemplary subtitle control using the PCS. Level 2 shows function segments belonging to Browsing Units. Level 1 shows subtitles rendered as a result of the function segments in the Browsing Units. It can be seen that the graphics data (subtitles) is defined by the ODS, and the rendering area of the graphics data on the screen is defined by the WDS when performing the subtitle display as shown in Level 1 of FIG. 22. Furthermore, page control including Cut-In/Out, Fade-In/Out, Color Change, Scroll and Wipe-In/Out are defined by the PCS (Presentation Control Segment).

No matter which piece of picture data is selected by a chapter skip, the selected piece of picture data can be properly displayed since the above Epochs are included in each of the Browsing Units. This completes the description of function segments in the PG stream. Next is a description of function segments in the IG stream. FIG. 23A shows function segments belonging to a Browsing Unit.

As shown in the figure, the Browsing Unit includes an ICS (Interactive Composition Segment), a PDS (Palette Definition Segment), an ODS (Object Definition Segment) and an END (END of Display Set Segment).

The ODS (Object Definition Segment) is graphics data that defines the design of a graphic when rendering a button.

The PDS (Palette Definition Segment) is a function segment that defines color when rendering the graphics data.

The ICS (Interactive Composition Segment) is a function segment that defines interactive control which changes button states according to user operation.

FIG. 23B shows an internal structure of the ICS. The ICS is composed of pieces of button information. The pieces of button information correspond respectively to individual buttons of an interactive control screen. Specifically, the ICS is composed of "neighbor_info" which shows a button to move the focus to if the focus is on a corresponding button and then a move key is pressed, "state_info" that shows which ODS is to be used to display states such as a normal state and selected state of a corresponding button, and "navigation commands" to cause the playback apparatus to perform execution when selection of a corresponding button is confirmed.

The data structures of the above-described PG stream and IG stream are summaries of content included in the following publicly known document. More detailed technical content can be found in the following document.

International Publication No. WO 2004/077826

The following describes a specific example of an ICS.

Here, the ICS has state_info, neighbor_info and a navigation command configured as shown in FIGS. 24A and 24B. FIGS. 24A and 24B show an exemplary ICS that specifies interactive control of the slideshow.

1. State_info

If a button ("top" button) corresponding to Button_info(0) is in a normal state, state_info of Button_info(0) is specified such that a triangular graphic with "top" is rendered on the screen. Also, the state_info is specified such that the triangular graphic with "top" is rendered in an emphasized state if focus is on the "top" button (in a selected state). As a result of this specification, the "top" button can be handled as a button for skipping to the first still image.

If a button ("+1" button) corresponding to Button_info(1) is in the normal state, state_info of Button_info(1) is specified such that a triangular graphic with "+1" is rendered on the screen. Also, the state_info of Button_info(1) is specified such that the triangular graphic with "+1" is rendered in an emphasized state if the "+1" button is in the selected state. As a result of this specification, the "+1" button can be handled as a button for skipping to the next still image.

If a button ("−1" button) corresponding to Button_info(2) is in the normal state, state_info of Button_info(2) is specified such that a triangular graphic with "−1" is rendered on the screen. Also, the state_info of Button_info(2) is specified such that the triangular graphic with "−1" is rendered in an emphasized state if the "−1" button is in the selected state. As a result of this specification, the "−1" button can be handled as a button for skipping to the previous still image.

If a button ("+10" button) corresponding to Button_info(3) is in the normal state, state_info of Button_info(3) is specified such that a triangular graphic with "+10" is rendered on the screen. Also, the state_info of Button_info(3) is specified such that the triangular graphic with "+10" is rendered in an emphasized state if the "++10" button is in the selected state. As a result of this specification, the "+10" button can be handled as a button for skipping to the 10th still image from the still image currently displayed.

If a button ("−10" button) corresponding to Button_info(4) is in the normal state, state_info of Button_info(4) is specified such that a triangular graphic with "−10" is rendered on the screen. Also, the state_info of Button_info(4) is specified such that the triangular graphic with "−10" is rendered in an emphasized state if the "−10" button is in the selected state. As a result of this specification, the "−10" button can be handled as a button for skipping back 10 frames.

As shown in FIG. 25A, the graphics specified by state_info of the buttons from the "top" button to the "−10" button are included in the ODSs of the IG stream. State_info is configured with this kind of content, and a PTS indicates a point tx on a time-axis at which an xth picture is to be displayed, as shown in FIG. 25B. As a result of this, a menu as shown in FIG. 25C is displayed in combination with the xth still image when the playback point of the video stream reaches the point tx.

2. Neighbor_info of an ICS

Figure 24:
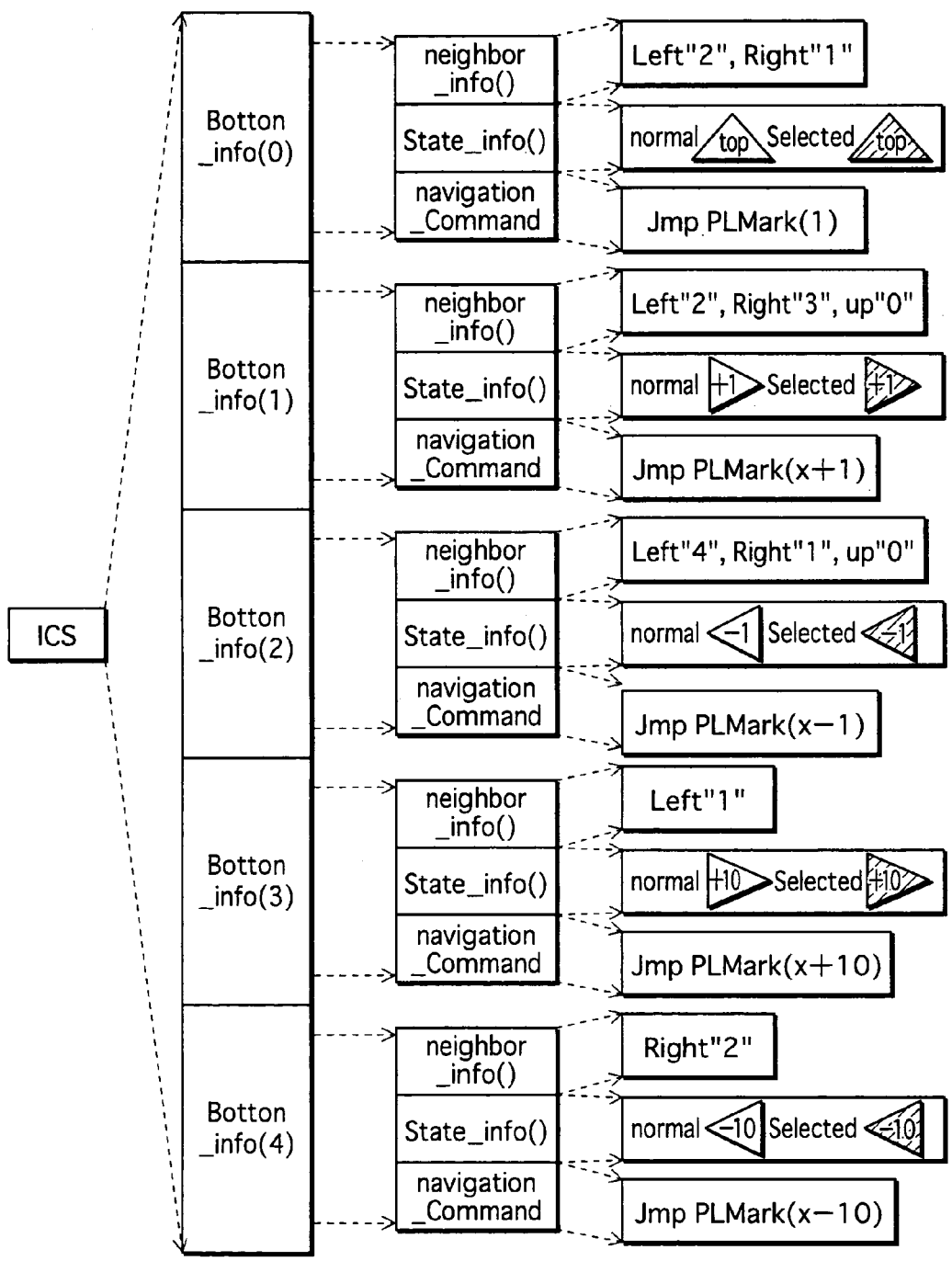
FIG. 24 shows an exemplary ICS that defines interaction control in the slideshow.

The following references neighbor_info of each object B in FIG. 24.

Neighbor_info of Button_info(0) is specified such that the focus is moved to the "−1" button having the number "2" when a left key is pressed, and to the "+1" button having the number "1" when a right key is pressed.

Neighbor_info of Button_info(1) is specified such that the focus is moved to the "top" button having the number "0" when an up key is pressed, to the "−1" button having the number "2" when the left key is pressed, and to the "+10" button having the number "3" when the right key is pressed.

Neighbor_info of Button_info(2) is specified such that the focus is moved to the "−10" button having the number "4" when the left key is pressed, to the "+1" button having the number "1" when the right key is pressed, and to the "top" button having the number "0" when the up key is pressed.

Neighbor_info of Button_info(3) is specified such that the focus is moved to the "+1" button having the number "1" when the left key is pressed.

Neighbor_info of Button_info(4) is specified such that the focus is moved to the "−1" button having the number "2" when the right key is pressed.

Figure 26:
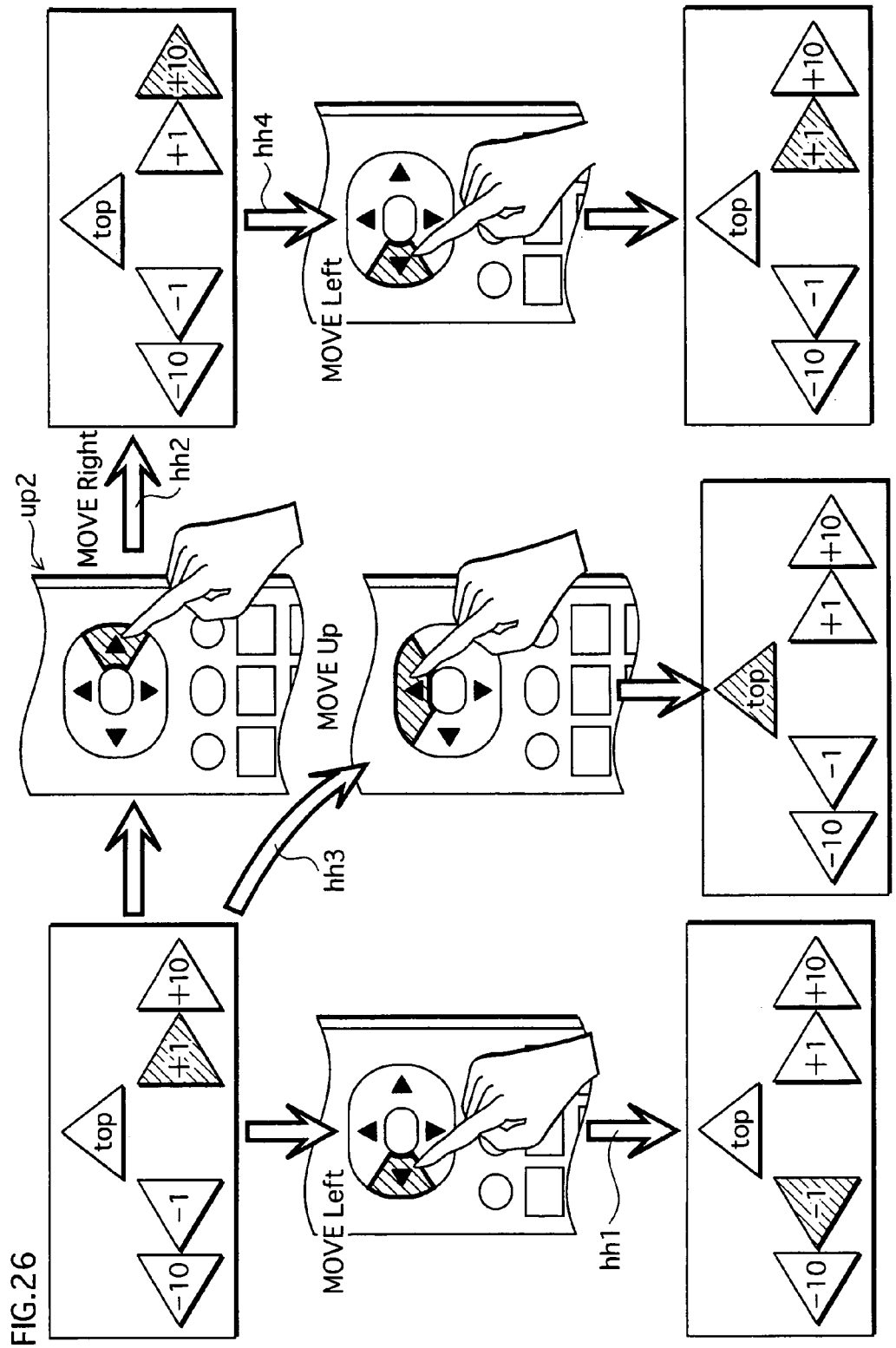
FIG. 26 shows a state transition in a menu displayed in the slideshow.

The above specifications of neighbor_info enable the realization of state transitions as shown in FIG. 26. FIG. 26 shows state transitions of a menu displayed in the slideshow.

Specifically, if the left key is pressed while the focus is on the "+1" button, the focus can be moved to the "−1" button (hh1).

If the right key is pressed while the focus is on the "+1" button, the focus can be moved to the "+10" button (hh2). Furthermore, if the left key is pressed while the focus is on the "+10" button, the focus can be returned to the "+1" button (hh4). If the up key is pressed while the focus is on the "+1" button, the focus can be moved to the "top" button (hh3).

As mentioned above, the "top" button, "+1" button, "−1" button, "+10" button and "−10" button are respectively for skipping to the beginning, next picture, previous picture, 10 pictures ahead and 10 pictures back. Given that the focus moves in accordance with a user press of the up, down, left and right keys when these buttons are displayed, the user can make an arbitrary one of the "+1" to "−10" buttons a selection target.

3. Navigation Commands of an ICS

The navigation command of Button_info(0) is specified such that Jmp PLMark(1) is executed if a determination operation is performed on the "top" button.

The navigation command of Button_info (1) is specified such that Jmp PLMark(x+1) is executed if the determination operation is performed on the "+1" button.

The navigation command of Button_info(2) is specified such that Jmp PLMark(x−1) is executed if the determination operation is performed on the "−1" button.

The navigation command of Button_info(3) is specified such that Jmp PLMark(x+10) is executed if the determination operation is performed on the "+10" button.

These navigation commands designate a PLMark as a branch destination. The number value inside the parentheses pertaining to the PLMark designates a picture as the branch destination. In other words, PLMark(1) is a PLMark indicating the first picture. PLMark(x+1) is a PLMark indicating the picture corresponding to x−1. PLMark(x+10) is a PLMark indicating a picture corresponding to x+10. PLMark(x−10) is a PLMark indicating a picture corresponding to x−10.

The navigation commands of the button information designate PLMark(1), PLMark(x+1), PLMark(x−1), PLMark(x+10), PLMark(x−10) as branch destinations, thereby enabling random access to, with respect to the xth still picture, the first still picture, x+1th still picture, x−1th still picture, x+10th still picture, and x−10th still picture when a button is selected.

Figure 27:
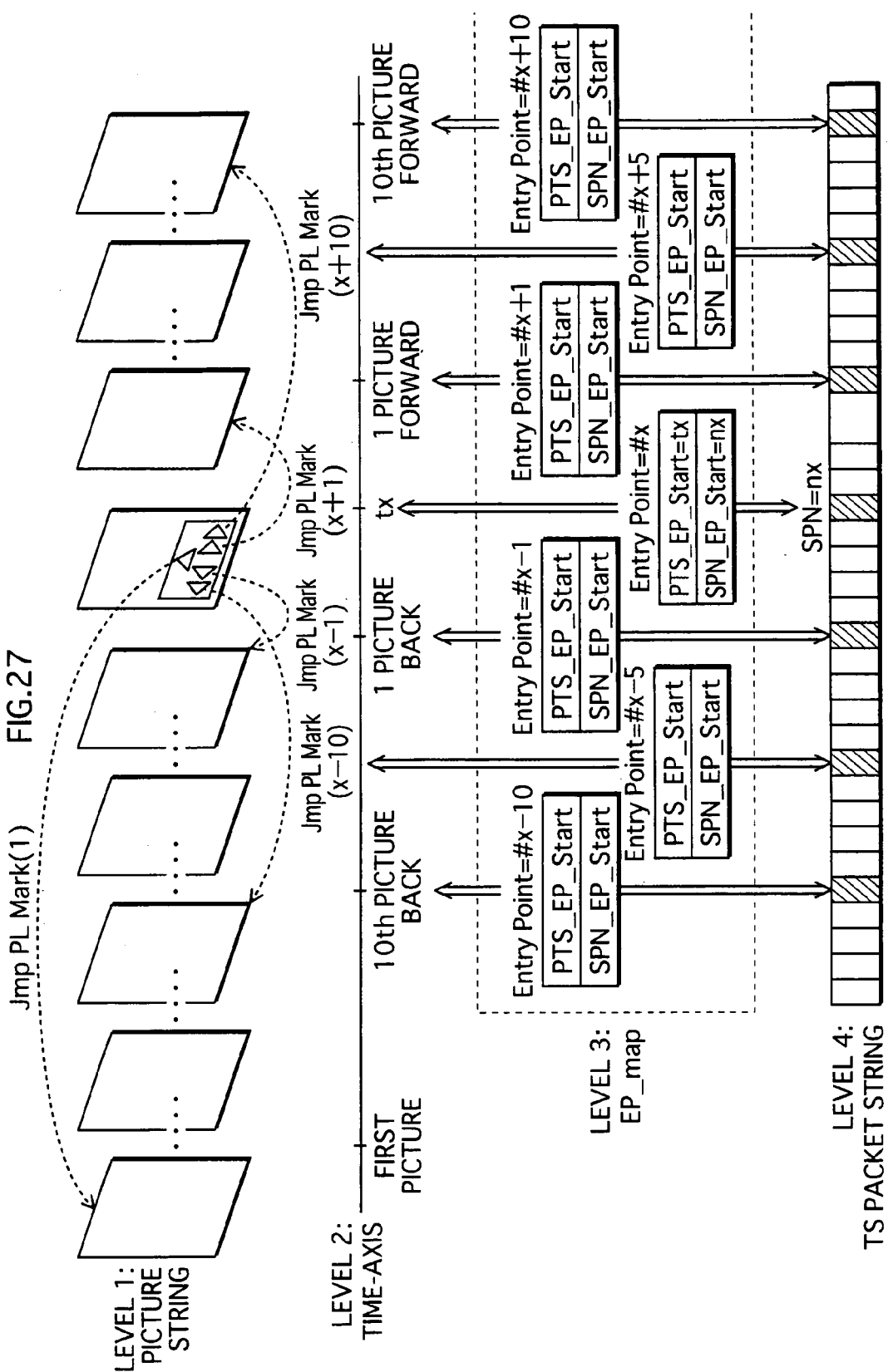
FIG. 27 shows a branch resulting from a navigation command of the slideshow.

Given that the focus can be moved to an arbitrary button as a result of the focus movement shown in FIG. 26, the user can perform the determination operation while the focus is on any of the buttons to cause the playback apparatus to execute the navigation command corresponding to the selected button, thereby enabling the execution of the branching as shown in FIG. 27. FIG. 27 shows branching as a result of navigation commands of the slideshow. Level 1 of this figure shows a plurality of pictures that constitute the slideshow, and branches to these pictures. Level 2 is the time-axis of the slideshow, Level 3 is an entry map configured with respect to the picture string of level 2, and level 4 shows a TS packet string on the BD-ROM.

Figure 28:
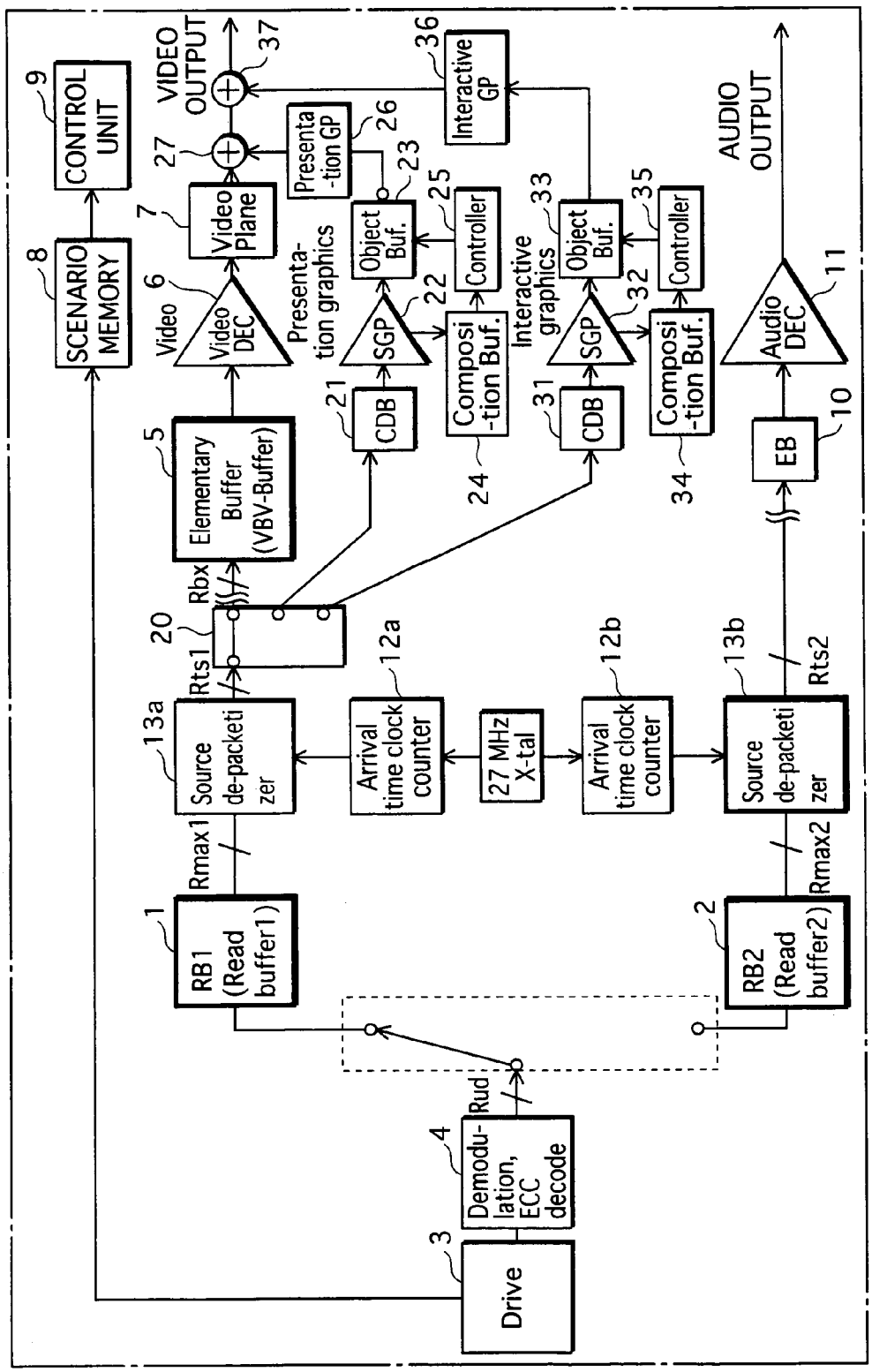
FIG. 28 shows an internal structure of a playback apparatus pertaining to embodiment 2.

Arrows of level 1 in the figure symbolically show branches resulting from the navigation commands (JmpPLMark(1), JmpPLMark(x+1), JmpPLMark(x−1), JmpPLMark(x+10), JmpPLMark(x−10)) shown in FIG. 24. As a result of these branches, the first still picture, next still picture, previous still picture, 10th still picture ahead, or 10th still picture back is played back. These branches are based on the navigation commands shown in FIG. 24, thereby enabling an arbitrary still picture to be played back by user operation. This completes the description of function segments belonging to the IG stream. This ends the description of the recording medium pertaining to the present embodiment. Next is a description of improvements to the playback apparatus pertaining to the present embodiment. FIG. 28 shows an internal structure of the playback apparatus pertaining to embodiment 2. In order to playback the PG stream and the IG stream, the playback apparatus is provided with a PID Filter 20, a Coded Data Buffer 21, a Stream Graphics Processor 22, an Object Buffer 23, a Composition Buffer 24, a Composition Controller 25, a Presentation Graphics Plane 26, a Composition Unit 27, a Coded Data Buffer 31, a Stream Graphics Processor 32, an Object Buffer 33, a Composition Buffer 34, a Composition Controller 35, an Interactive Graphics Plane 36 and a Composition Unit 37.

The PID Filter 20 judges whether a TS packet belongs to the video stream, the PG stream, or the IG stream by referencing a PID attached to the TS packet, and outputs the TS packet to the Elementary Buffer 5, the Coded Data Buffer 21, or the Coded Data Buffer 31.

The Coded Data Buffer (CDB) 21 is a buffer that stores PES packets constituting the PG stream.

The Stream Graphics Processor (SGP) 22 decodes the PES packets (ODS) storing graphics data, and writes an uncompressed bitmap, which is composed of index colors obtained by the decoding, to the Object Buffer 23 as graphics data.

The Object Buffer 23 has disposed therein the graphics data obtained by the decoding performed by the Stream Graphics Processor 22.

The Composition Buffer 24 is a memory in which control information (PCS) for rendition of the graphics data is arranged.

The Graphics Controller 25 decodes the PCS stored in the Composition Buffer 24, and performs control according to the decoding result.

The Presentation Graphics Plane 26 is a memory area having a size equivalent to one screen, and can store an uncompressed graphic pertaining to one screen. The resolution of this plane is 1920×1080, and each pixel of the uncompressed graphic in the Presentation Graphics Plane 26 is expressed as an 8-bit index color. The uncompressed graphic stored in the Presentation Graphics Plane 26 is provided for display by converting this index color using a CLUT (Color Lookup Table).

The Composition Unit 27 composites an uncompressed frame image stored in the video plane 7 and the uncompressed graphics data stored in the Presentation Graphics Plane 26. This composition enables the display of a composited image in which subtitles are superimposed on a video image.

Here, the Coded Data Buffer 21, the Stream Graphics Processor 22, the Object Buffer 23, the Composition Buffer 24, the Composition Controller 25 and the Presentation Graphics Plane 26 constitute a PG decoder for decoding the PG stream. When a Browsing Unit is read from the BD-ROM, the Composition Controller 25 judges whether Composition_State of the PCS in the new Browsing Unit shows Epoch Start. If Composition_State of the PCS of the new Browsing Unit shows Epoch Start, the Composition Controller 25 performs processing to reset the PG decoder. This reset is performed by clearing the content of the Coded Data Buffer 21, the Object Buffer 23, the Composition Buffer 24 and the Presentation Graphics Plane 26. Given that all the Browsing Units are configured such that Composition_State of the PCS shows Epoch Start, the PG decoder is reset each time a Browsing Unit constituting the Browsable SlideShow is read, and the content of all the buffers in the decoder is cleared.

The Coded Data Buffer (CDB) 31 stores PES packets constituting the IG stream.

The Stream Graphics Processor (SGP) 32 decodes the PES packets storing graphics data, and writes an uncompressed bitmap, which is composed of index colors obtained by the decoding, to the Object Buffer 33 as graphics data.

The Object Buffer 33 has disposed therein the graphics data obtained by the decoding performed by the Stream Graphics Processor 32.

The Composition Buffer 34 is a memory in which control information for rendition of the graphics data is arranged.

The Graphics Controller 35 decodes the control information disposed in the Composition Buffer 34, and performs control according to the decoding result.

An uncompressed graphic obtained by the decoding performed by the Stream Graphics Processor (SGP) 32 is written to the Interactive Graphics Plane 36. The resolution of this plane is 1920×1080, and each pixel of the uncompressed graphic in the Interactive Graphics Plane 36 is expressed as an 8-bit index color. The uncompressed graphic stored in the Interactive Graphics Plane 36 is provided for display by converting this index color using a CLUT (Color Lookup Table).

The Composition Unit 37 composites the uncompressed graphic stored in the Interactive Graphics Plane 36 and the composited image output by the Composition Unit 27 (the composited uncompressed graphics data of the Presentation Graphics Plane 27 and uncompressed picture data).

The Coded Data Buffer 31, the Stream Graphics Processor 32, the Object Buffer 33, the Composition Buffer 34, the Composition Controller 35 and the Interactive Graphics Plane 36 constitute an IG decoder for decoding the IG stream. When a Browsing Unit is read from the BD-ROM, the Composition Controller 35 judges whether Composition_State of the ICS in the new Browsing Unit shows Epoch Start. If Composition_State of the ICS of the new Browsing Unit shows Epoch Start, the Composition Controller 35 performs processing to reset the IG decoder. This reset is performed by clearing the content of the Coded Data Buffer 31, the Object Buffer 33, the Composition Buffer 34 and the Interactive Graphics Plane 36. Given that all the Browsing Units are configured such that Composition_State of the ICS shows Epoch Start, the IG decoder is reset each time a Browsing Unit constituting the Browsable SlideShow is read, and the content of all the buffers in the decoder is cleared.

According to the present embodiment, a subtitle display and a main menu display can be added to the playback of individual pieces of picture data during display since the PG stream and the IG stream are multiplexed in the Browsing Units. This enables the realization of more convenient slideshow playback.

Embodiment 3

Figure 29:
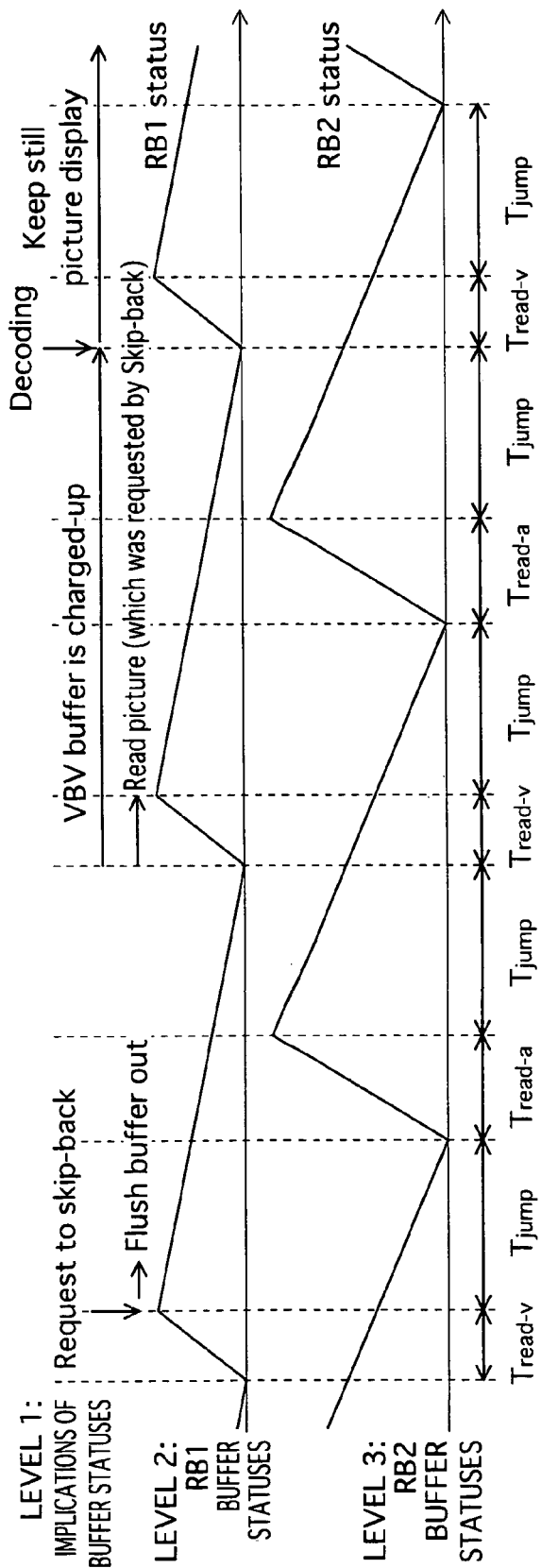
FIG. 29 shows buffer statuses in the case of a chapter skip being performed.

Embodiment 3 speeds up the display of a picture when there is a chapter skip. FIG. 29 shows buffer statuses in the case of a chapter skip being performed. Level 1 shows buffer statuses of the Read Buffer 1, and level 2 shows buffers statuses of the Read Buffer 2. A chapter skip is requested during Tread-v in level 1. Even if a chapter skip is requested at this point, the Read Buffer 1 must first be filled with the picture data currently being read, and a flash of the Read Buffer 1 is therefore started after the Read Buffer 1 has been filled. Reading of the picture data requested by the chapter skip is performed after one cycle has passed, and decoding of this picture data further requires one cycle to pass. Consequently, the picture data requested by the chapter skip is displayed after two cycles have passed. The present embodiment eliminates the delay in display of picture data when there is a chapter skip. The following describes improvements to the playback apparatus of the present embodiment for elimination of the display delay.

First, supply from the Read Buffer 1 to the Elementary Buffer 5 is performed at a high transfer rate. Specifically, the supply rate Rmax1 from the Read Buffer 1 to the Elementary Buffer 5 is (192/188)×48 Mbps in the present embodiment. It is apparent that although Rmax1 in embodiment 1 did not exceed the low supply rate of (192/188)×2 Mbps, Rmax1 of the present embodiment has been dramatically increased to (192/188)×48 Mbps. Writing to the Elementary Buffer 5 is performed in bursts as a result of configuring the transfer rate Rmax1 to this high rate. The picture data requested by the chapter skip is displayed immediately since transfer to the Elementary Buffer 5 is completed in a very short period.

Given that Rmax1 is increased as above, the size of a Browsing Unit in the present embodiment is configured to be less than or equal to a sum of the capacities of the Elementary Buffer 10, the Code Data Buffer 21 and the Code Data Buffer 31.

In other words, the size of a Browsing Unit is configured so as to satisfy the following condition.

Size of Browsing Unit≤Elementary Buffer 10+Code Data Buffer 21+Code Data Buffer 31

Figure 30A:
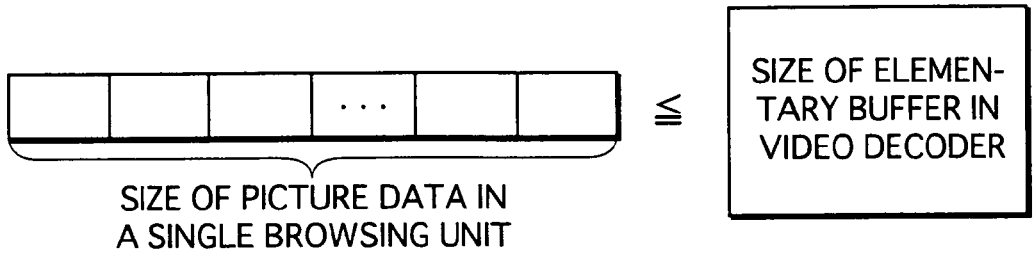
FIG. 30A shows a size restriction of picture data in the Browsing Unit.
Figure 30B:
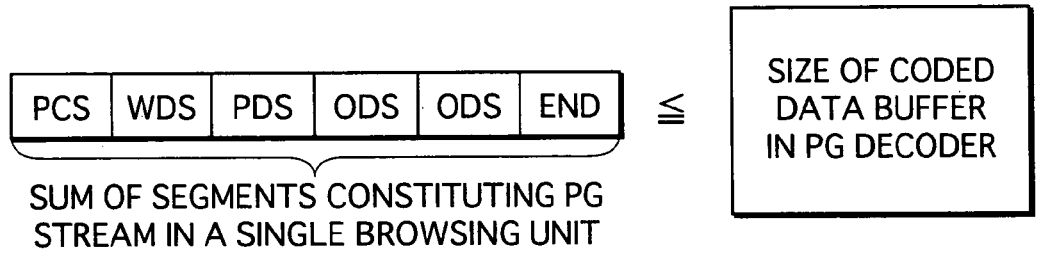
FIGS. 30B and 30C show size restrictions of function segments belonging to the Browsing Unit.
Figure 30C:
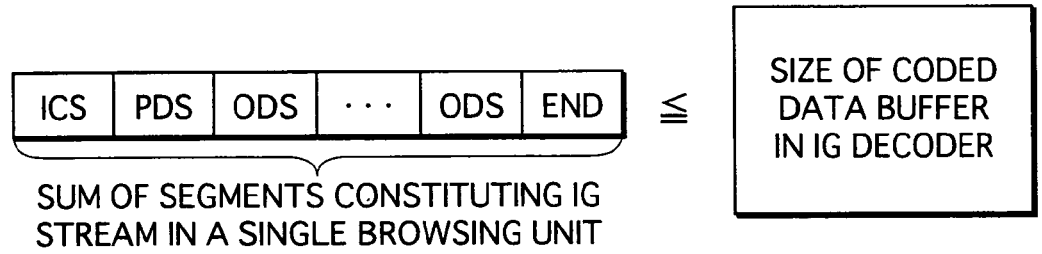

In order to satisfy this condition, the size of picture data in a Browsing Unit is configured to be less than or equal to the size of the Elementary Buffer 5 of the video encoder, as shown in FIG. 30A, and the total size of function segments belonging to the Browsing Unit is configured to be less than or equal to the size of the Coded Data Buffers 21 and 31, as shown in FIGS. 30B and 30C.

Figure 31:
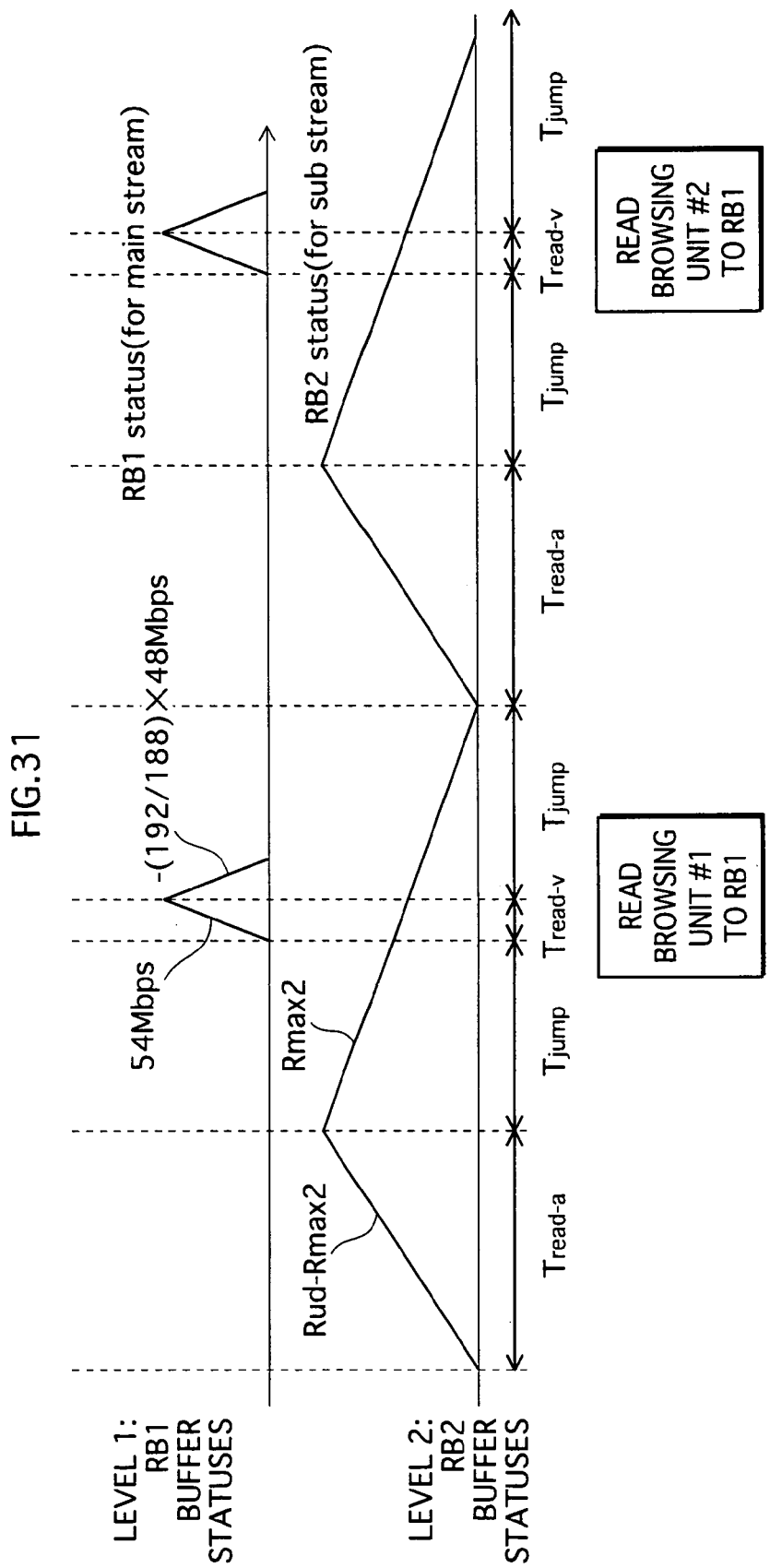
FIG. 31 shows buffer statuses of the Read Buffer 1 and the Read Buffer 2 from the internal structure shown in FIG. 28.

FIG. 31 shows buffer statuses of the Read Buffer 1 and the Read Buffer 2, which are portions of the internal structure shown in FIG. 28. Level 1 shows buffer statuses of the Read Buffer 1, and level 2 shows buffer statuses of the Read Buffer 2. The supply rate Rmax1 to the Elementary Buffer 5 is set to −(192/188)×48 Mbps, whereby it is apparent that transfer to the Elementary Buffer 5 is performed in a very short period.

FIG. 32 shows changes in buffer statuses of the Elementary Buffer 5, and the Coded Data Buffers 21 and 31 as a result of output from the Read Buffer 1. Level 1 shows buffer statuses of the Elementary Buffer 5 as a result of picture data being transferred from the Read Buffer 1 to the Elementary Buffer 5, and levels 2 and 3 show buffer statuses of the Elementary Buffer 5 as a result of function segments being transferred from the Read Buffer 1 to the Coded Data Buffers 21 and 31. Given that a Browsing Unit includes completed picture data and function segments constituting completed Epochs, content of the Elementary Buffer 5 and the Coded Data Buffers 21 and 31 is replaced with new content by the high-rate transfer from the Read Buffer 1. It is possible to playback previous or subsequent pieces of picture data with subtitles according to a chapter skip since this high-rate transfer enables content of the Elementary Buffer 5 and the Coded Data Buffers 21 and 31 to be replaced quickly in response to the chapter skip.

In order to quickly send graphics data to the Elementary Buffer 5 in response to user operation, the graphics data must be burst-transferred at a high rate. However, if graphics data is burst-written to the Elementary Buffer 5 while some data still remains on the buffer, there is the potential for overflow of the Elementary Buffer 5. As mentioned in the previous embodiment, with respect to the PG stream and the IG stream, a unit of memory management called an Epoch is complete in a single Browsing Unit, and the total size of function segments in the Browsing Unit is made less than or equal to the size of the Coded Data Buffers 21 and 31 as shown in FIGS. 30B and 30C. When playing back a new picture, function segments previously stored in the buffers are not used since the IG stream in the Browsing Unit is a completed Epoch and smaller than or equal to the size of the Coded Data Buffers 21 and 31. All the function segments of the IG stream that are in the buffers need only be flashed, and new function segments may be written. As a result, the Coded Data Buffers 21 and 31 may be flashed, and new graphics data may be written in a burst when there is a chapter skip. This enables the realization of a quick chapter skip in response to user operation.

Remarks

The above description by no means shows the implementation of all configurations of the present invention. Implementation of the present invention is still possible according to implementation of configurations that carry out the following modifications (A), (B), (C), (D), . . . . The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of the application.

(A) Although an optical disk pertaining to the present invention is implemented as a BD-ROM in all of the embodiments, the recording medium of the present invention is characterized by the recorded EP_map, and this characteristic is not dependent on the physical properties of a BD-ROM. Any form of recording media is applicable as long as there exists the capacity to record an EP_map. For example, optical disks such as DVD-ROM, DVD-RAM, DVD-RW, DVD-R, DVD+RW, DVD+R, CD-R, CD-RW and the like, and optical-magnetic disks such as PD, MO and the like are applicable. Semiconductor cards such as a CompactFlash card (registered trademark), a SmartMedia card, a Memory Stick, a MultiMedia card, a PCM-CIA card and the like are also applicable, as well as (i) magnetic recording disks such as a flexible disk, SuperDisk, Zip, Clik! and the like, and (ii) removable hard disk drives such as ORB, Jaz, SparQ, SyJet, EZFley, microdrive and the like. Furthermore, the recording medium may also be a built-in hard disk.

(B) Although the playback apparatuses in all of the embodiments output AVClips recorded on a BD-ROM to a TV after decoding, the playback apparatus may be structured from only a BD-ROM drive, and the TV may be equipped with all of the other elements. In this case, the playback apparatus and the TV can be incorporated into a home network connected using IEEE1394. Also, although the playback apparatuses in the embodiments are of a type used after connecting to a television, integral display-playback apparatuses are also applicable. Furthermore, the playback apparatus may be only a system LSI (integrated circuit) that performs essential parts of the processing in the playback apparatuses of the embodiments.

(C) Because of the information processing by a computer program shown in each of the flowcharts being realized specifically using hardware resources, a computer program showing the processing procedures in the flowchart forms an invention in its own right. Although all of the embodiments show embodiments that relate to the implementation of computer programs pertaining to the present invention in an incorporated form in the playback apparatuses, the computer programs shown in the first to third embodiments may be implemented in their own right, separate from the playback apparatuses. The implementation of the computer programs in their own right includes acts that involve: (1) production of the programs, (2) transference of the programs, either gratuitous or otherwise, (3) lending of the programs, (4) importing of the programs, (5) providing the programs publicly via bi-directional electronic communications circuits, and (6) approaching the general user about transfer, rental and the like by means of show-window displays, catalogue solicitation, pamphlet distribution, and so forth.

(D) Although digital streams in the embodiments are AVClips complying with a BD-ROM standard, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, MPEG-AAC format, or dts format.

(E) Although Still_time is a constituent element of PlayItem information, Still_time may be caused to be held in each piece of audio data.

Note that in the case of using Still_time to automatically switch picture data, this switching may be performed according to the time indicated by Still_time by moving processing for picture display ahead of only the seek time and the picture data reading time.

(F) It is desirable for a main stream and a sub stream in the Browsable SlideShow to be disposed within 4200,000 sectors in a single layer. It is also desirable for the main stream and the sub stream of the Browsable SlideShow to be disposed in succession.

(G) If TS_recording_rate(Rts2) in the sub stream is ≤2 Mbps, TS_recording_rate(Rts1) in the main stream may be ≤15 Mbps.

INDUSTRIAL APPLICABILITY

An optical disc and a playback apparatus of the present invention may be used personally as in a home theater system. However, the optical disc and the playback apparatus of the present invention may be produced and used in the industrial production field since the internal structure thereof is disclosed in the embodiments described above, and it is apparent that the playback apparatus of the present invention will be mass-produced. For this reason, the optical disc and the playback apparatus of the present invention have industrial applicability.

The invention claimed is:

1. A recording method for recording, on an optical disc, a multiplexed stream and an audio stream constituting a browsing slideshow, the recording method comprising:
creating the multiplexed stream by multiplexing a video stream and a graphics stream;
creating the audio stream;
creating playlist information and stream information; and
recording the multiplexed stream and the audio stream respectively in a multiplexed stream recording area and an audio stream recording area of the optical disc without multiplexing the multiplexed stream and the audio stream, and recording the playlist information and the stream information on the optical disc, wherein
the multiplexed stream is a transport stream in which the video stream and the graphics stream are multiplexed, the video stream including a plurality of pieces of picture data, the graphics stream including a plurality of function segments, the plurality of pieces of picture data and the plurality of function segments having being multiplexed after being converted into TS packets, a TS packet constituting one or more of the plurality of pieces of picture data and a TS packet constituting a group of function segments from among the plurality of function segments constituting a browsing unit in the multiplexed stream,
the group of function segments constitutes a subtitle to be displayed by being combined with the plurality of pieces of picture data, and includes (i) an object definition segment for defining a graphics object representing the subtitle, (ii) a presentation control segment for defining screen configuration using the graphics object and (iii) an end segment indicating an end of each of the function segments, the presentation control segment including state information in accordance with which a graphics decoder starts memory management by clearing content of an object buffer of the graphics decoder, the object buffer being for storing therein the graphics object obtained by decoding the function segments,
the stream information includes transfer rate information indicating a transfer rate of the TS packets constituting the multiplexed stream from a PID filter included in a playback apparatus to a transport buffer included in a decoder, and
the playlist information includes two or more pieces of playitem information each including period information indicating a time required to read, when the playitem information is current playitem information, a next browsing unit specified by playitem information subsequent to the current playitem information to the transport buffer included in the decoder, the time being based on a value obtained by dividing a data size of the next browsing unit by the transfer rate of the TS packets indicated by the transfer rate information.

2. A recording medium playback system including a playback apparatus and the optical disc on which the playlist information, the multiplexed stream, the audio stream and the stream information have been recorded by the recording method of claim 1, wherein
the playback apparatus includes:
a read unit operable to read the multiplexed stream and the audio stream from the optical disc;
a first read buffer;
a second read buffer;
a video decoder operable to decode the plurality of pieces of picture data;
the graphics decoder operable to decode the plurality of function segments after storing the function segments in a coded data buffer;
an audio decoder operable to decode the audio stream; and
a control unit operable to perform playback control based on the playlist information,
the plurality of pieces of picture data included in the video stream are read from the optical disc and stored in a buffer for video via the first read buffer,
the plurality of function segments included in the graphics stream are read from the optical disc and stored in the coded data buffer via the first read buffer,
the audio stream is read from the optical disc and stored in a buffer for audio via the second read buffer,
the graphics decoder includes:
a processor operable to decode the function segments to obtain the graphics object; and
the object buffer for storing therein the obtained graphics object, and
when the browsing unit is read from the optical disc, starts the memory management by clearing the content of the object buffer in accordance with the state information included in the presentation control segment included in the group of function segments constituting the browsing unit together with the one or more of the plurality of pieces of picture data.

3. The recording medium playback system of claim 2, wherein
a size of the first read buffer RB1 is 1.5 MB, and
the size of the first read buffer RB1 and a size of the second read buffer RB2 satisfy the following relationship:

$$RB1 \geq Rmax1 \times \{2 \times Tjump + RB2/(Rud - Rmax2)\}; \text{ and}$$

$$RB2 \geq Rmax2 \times \{2 \times Tjump + RB1/(Rud - Rmax1)\}, \text{ where}$$

Rud represents a transfer rate between the optical disc and each of the first and second read buffers, Rmax1 represents a transfer rate between the first read buffer and the buffer for video, Rmax2 represents a transfer rate between the second read buffer and the buffer for audio, and Tjump represents a time required for an optical pickup to jump between the multiplexed stream recording area and the audio stream recording area of the optical disc.

* * * * *